United States Patent
Martinez et al.

(10) Patent No.: US 9,099,860 B2
(45) Date of Patent: Aug. 4, 2015

(54) OVERVOLTAGE PROTECTION AND MONITORING SYSTEM

(71) Applicants: Jonathan V. Martinez, Spokane Valley, WA (US); Shawn A. Warner, Rathdrum, ID (US); Konstantinos Bakatsias, Athens (GR); Grigoris Kostakis, Athens (GR); Robert A. Miller, Spokane Valley, WA (US)

(72) Inventors: Jonathan V. Martinez, Spokane Valley, WA (US); Shawn A. Warner, Rathdrum, ID (US); Konstantinos Bakatsias, Athens (GR); Grigoris Kostakis, Athens (GR); Robert A. Miller, Spokane Valley, WA (US)

(73) Assignee: RAYCAP INTELLECTUAL PROPERTY LTD., Nicosia (CY)

( * ) Notice: Subject to any disclaimer, the term of this patent is extended or adjusted under 35 U.S.C. 154(b) by 51 days.

(21) Appl. No.: 14/101,231

(22) Filed: Dec. 9, 2013

(65) Prior Publication Data

US 2014/0168842 A1    Jun. 19, 2014

Related U.S. Application Data

(60) Provisional application No. 61/735,166, filed on Dec. 10, 2012.

(51) Int. Cl.
| | |
|---|---|
| *H01C 7/12* | (2006.01) |
| *H02H 9/04* | (2006.01) |
| *H04L 29/08* | (2006.01) |
| *H01T 4/08* | (2006.01) |

(52) U.S. Cl.
CPC .. *H02H 9/04* (2013.01); *H01T 4/08* (2013.01); *H04L 67/025* (2013.01)

(58) Field of Classification Search
USPC .................................................. 361/117–119
See application file for complete search history.

(56) References Cited

U.S. PATENT DOCUMENTS

| | | | |
|---|---|---|---|
| 3,165,372 | A | 1/1965 | Jacobs |
| 3,976,351 | A | 8/1976 | Hopfe |
| 4,030,061 | A | 6/1977 | Gaskell et al. |
| 4,236,190 | A | 11/1980 | Hollingsead et al. |
| 4,918,565 | A | 4/1990 | King |
| 4,976,508 | A | 12/1990 | Okura |
| 5,030,128 | A | 7/1991 | Herron et al. |

(Continued)

FOREIGN PATENT DOCUMENTS

| | | |
|---|---|---|
| DE | 698717 B1 | 10/2009 |
| EP | 1855365 | 11/2007 |

(Continued)

OTHER PUBLICATIONS

"Relay" from Wikipedia. Downloaded Oct. 30, 2009.

(Continued)

*Primary Examiner* — Danny Nguyen
(74) *Attorney, Agent, or Firm* — Stolowitz Ford Cowger LLP

(57) ABSTRACT

A suppression system provides more effective protection for communication stations with distributed radio and power systems. The suppression system provides surge protection both locally close to the radio station building where the power plant and telecommunication equipment are located and remotely next to the radios and antennas located outside of the building on the communication tower. Local and remote suppression units may include monitor circuitry that monitor remote and local DC voltage levels and alarm conditions. The alarm conditions may include over-voltage protection failures, intrusions, and/or water infiltration. Displays on both the local and remote suppression units identify the voltage levels and alarm conditions.

24 Claims, 20 Drawing Sheets

(56) References Cited

U.S. PATENT DOCUMENTS

| | | |
|---|---|---|
| 5,311,397 A | 5/1994 | Harshberger et al. |
| D361,314 S | 8/1995 | Ryan |
| D362,232 S | 9/1995 | Ryan |
| 5,473,718 A | 12/1995 | Sommer |
| 5,530,215 A | 6/1996 | Couvreur |
| 5,555,153 A | 9/1996 | Frederiksen |
| 5,602,532 A | 2/1997 | Ryan |
| 5,627,721 A | 5/1997 | Figueiredo |
| 5,651,698 A | 7/1997 | Locati et al. |
| 5,701,227 A | 12/1997 | Ryan |
| 5,790,360 A | 8/1998 | Ryan |
| 5,903,693 A | 5/1999 | Brown |
| 5,953,193 A | 9/1999 | Ryan |
| 5,966,282 A | 10/1999 | Ryan |
| 5,969,932 A | 10/1999 | Ryan |
| 6,031,706 A | 2/2000 | Nabell |
| 6,038,119 A | 3/2000 | Atkins |
| 6,074,247 A | 6/2000 | Hall |
| 6,122,156 A | 9/2000 | Nabell |
| 6,430,020 B1 | 8/2002 | Atkins |
| 6,535,369 B1 | 3/2003 | Redding et al. |
| 6,556,402 B2 | 4/2003 | Kizis |
| 6,623,315 B1 | 9/2003 | Roderick |
| 6,654,223 B1 | 11/2003 | Bippus |
| 6,719,615 B1 | 4/2004 | Molnar |
| 6,729,902 B2 | 5/2004 | Martich |
| 6,771,861 B2 | 8/2004 | Wagner |
| 6,851,966 B1 | 2/2005 | Tomasino |
| 6,876,533 B1 | 4/2005 | Ryan |
| 7,008,256 B2 | 3/2006 | Poiraud |
| 7,035,073 B2 | 4/2006 | Bennett et al. |
| 7,228,047 B1 | 6/2007 | Szilagyi |
| 7,397,673 B1 | 7/2008 | Wilson |
| 7,433,169 B2 | 10/2008 | Kamel |
| 7,768,794 B1 | 8/2010 | Wilson |
| 7,946,863 B2 | 5/2011 | Loch |
| 8,021,189 B2 | 9/2011 | Zayas et al. |
| 8,467,655 B2 | 6/2013 | German |
| 8,490,799 B2 | 7/2013 | Knight |
| 8,730,639 B1 | 5/2014 | Wilson |
| 8,780,519 B2 * | 7/2014 | Miller et al. ............. 361/118 |
| 2002/0055306 A1 | 5/2002 | Jenks |
| 2002/0196593 A1 | 12/2002 | Kizis |
| 2003/0027521 A1 | 2/2003 | Yip et al. |
| 2003/0148668 A1 | 8/2003 | Lias |
| 2004/0119386 A1 | 6/2004 | Guidez |
| 2004/0246693 A1 | 12/2004 | Lloyd |
| 2005/0042920 A1 | 2/2005 | Poiraud |
| 2005/0157461 A1 | 7/2005 | Cauthron |
| 2006/0139836 A1 | 6/2006 | Anthony |
| 2006/0153362 A1 | 7/2006 | Bloodworth et al. |
| 2007/0163801 A1 | 7/2007 | Coffey et al. |
| 2008/0037188 A1 | 2/2008 | Wilson |
| 2008/0117555 A1 | 5/2008 | Wilson |
| 2008/0139045 A1 | 6/2008 | Ho |
| 2008/0186667 A1 | 8/2008 | Verdelli et al. |
| 2008/0278889 A1 | 11/2008 | Briggs et al. |
| 2008/0310060 A1 | 12/2008 | Metral et al. |
| 2009/0103218 A1 | 4/2009 | Ryan |
| 2010/0259871 A1 | 10/2010 | Ewing |
| 2011/0135316 A1 | 6/2011 | Fankhauser |
| 2012/0092835 A1 | 4/2012 | Miller |
| 2012/0200978 A1 | 8/2012 | Miller |
| 2012/0200979 A1 | 8/2012 | Miller |
| 2012/0230636 A1 | 9/2012 | Blockley |
| 2012/0319485 A1 | 12/2012 | Ewing |
| 2013/0146355 A1 | 6/2013 | Strasser |
| 2013/0340361 A1 | 12/2013 | Rogers |

FOREIGN PATENT DOCUMENTS

| | | |
|---|---|---|
| JP | 2005317472 | 12/2002 |
| WO | WO2006076120 | 7/2006 |
| WO | 2008/059212 A1 | 5/2008 |
| WO | 2012/108929 | 8/2012 |
| WO | 2012/108930 | 8/2012 |

OTHER PUBLICATIONS

Written Opinion for PCT/US11/064704; Date of mailing: May 16, 2012.

Written Opinion for PCT/US11/064717; Date of mailing: May 16, 2012.

International Search Report for PCT/US11/064704; Date of mailing: May 16, 2012.

International Search Report for PCT/US11/064717: Date of mailing: May 16, 2012.

Stolowitz Ford Cowger LLP, Listing of Related Cases, Feb. 3, 2013.

Preliminary Report on Patentability and Written Opinion of the International Searching Authority for PCT/US2011/064717; Date of mailing Aug. 13, 2013.

Preliminary Report on Patentability and Written Opinion of the International Searching Authority for PCT/US2011/064704; Date of mailing Aug. 13, 2013.

* cited by examiner

OVERVOLTAGE PROTECTION AND MONITORING SYSTEM

The present application claims priority to provisional application Ser. No. 61/735,166, filed Dec. 10, 2012; entitled: DETECTION AND NOTIFICATION SYSTEM FOR WIRELESS COMMUNICATION DEVICE, which is herein incorporated by reference.

The present application herein incorporates by reference in their entireties:

patent application Ser. No. 12/984,304 filed Jan. 4, 2011, entitled: OVERVOLTAGE PROTECTION SYSTEM FOR RADIO HEAD-BASED WIRELESS COMMUNICATION SYSTEMS;

patent application Ser. No. 13/005,275 filed Jan. 12, 2011; entitled: OVERVOLTAGE PROTECTION FOR REMOTE RADIO HEAD-BASED WIRELESS COMMUNICATIONS SYSTEMS; and patent application Ser. No. 13/301,685 filed Nov. 21, 2011; entitled: MODULAR AND WEATHER RESISTANT OVERVOLTAGE PROTECTION SYSTEM FOR WIRELESS COMMUNICATION SYSTEMS.

BACKGROUND

Until recently, most wireless communications sites included radio systems that were located on the ground level in a building, cabinet or other shelter. The DC power supply, baseband controller, amplifiers and radios were historically located in one location within the shelter. From this location, coaxial cable was run from the radios to antennas that were supported on a tower outside the building. Equipment installed in this manner is susceptible to lightning strike damage either due to lightning strikes directly hitting the antennas or from induced energy from the tower structure. Coaxial lightning protectors are commonly used to protect the antennas on the tower and radios on the ground. The DC power plant is somewhat isolated from direct lightning events, due to the radios, other dc-powered equipment and grounding obstructing the path of the lightning strike to earth.

Latest generation wireless communications systems, referred to as distributed antenna systems (DAS), distributed DC radio systems, remote radio heads (RRH), 4G and long term evolution (LTE) cellular communication systems, now commonly locate the radios next to the antennas on the tower outside of the communications shelter. In these next-generation facilities, the baseband system module that controls the radio traffic is still located at the ground level shelter, but the radios are separated from the controllers up to several hundred feet and controlled by fiber optic links. The radios are powered directly by DC feeds from the DC power plant that extend up the tower and to the radios. In some cases, the DC cables and fiber optic cables are run separately up the tower and in other cases they are all bundled together in one large hybrid cable.

The radios located outside of the communications shelter on top of the tower are much more susceptible to damage from lighting strikes and other electrical power surge events. Individual power lines are run to each individual radio also increasing the amount of power cabling exposed to power surge events. Thus, the DC power plant and telecommunication equipment at communication stations with distributed power have more risk of being damaged due to direct lighting strikes and power surges.

Overview

A suppression system provides more effective protection for communication stations with distributed radio and power systems. The suppression system provides surge protection both locally near the radio station building where the power plant and telecommunication equipment are located and remotely next to the radios and antennas located outside of the building on the communication tower.

Several different external suppression unit configurations provide waterproof easy to install enclosures for both suppression devices and fiber optic connectors. The external suppression units may have low wind load, reduced weight, and can be placed on a wide variety of different radio towers and building structures with tight space restrictions. The enclosures may be water resistant while also simplifying insertion of power cables and fiber optic cables within the interior of the enclosure. Pluggable suppression modules are easily attached and removed within the interior of the enclosures simplifying installation and maintenance.

A rack mountable suppression unit provides local in-line suppression protection for the electrical equipment located in the communication station. Suppression modules used within the suppression units are hot swappable and can be replaced without disrupting radio operation. The same pluggable suppression modules may be used in both the rack suppression unit and in the external suppression units.

The external and internal suppression units may include circuitry that monitors DC voltage levels and alarm conditions, such as suppression device failures, intrusion, and/or water exposure. Displays are provided on the suppression units that identify the voltage levels and alarm conditions.

DETAILED DESCRIPTION

Several preferred examples will now be described with reference to the accompanying drawings. Various other examples are also possible and practical. The suppression system may be exemplified in many different forms and should not be construed as being limited to the examples set forth herein.

Figure 1:
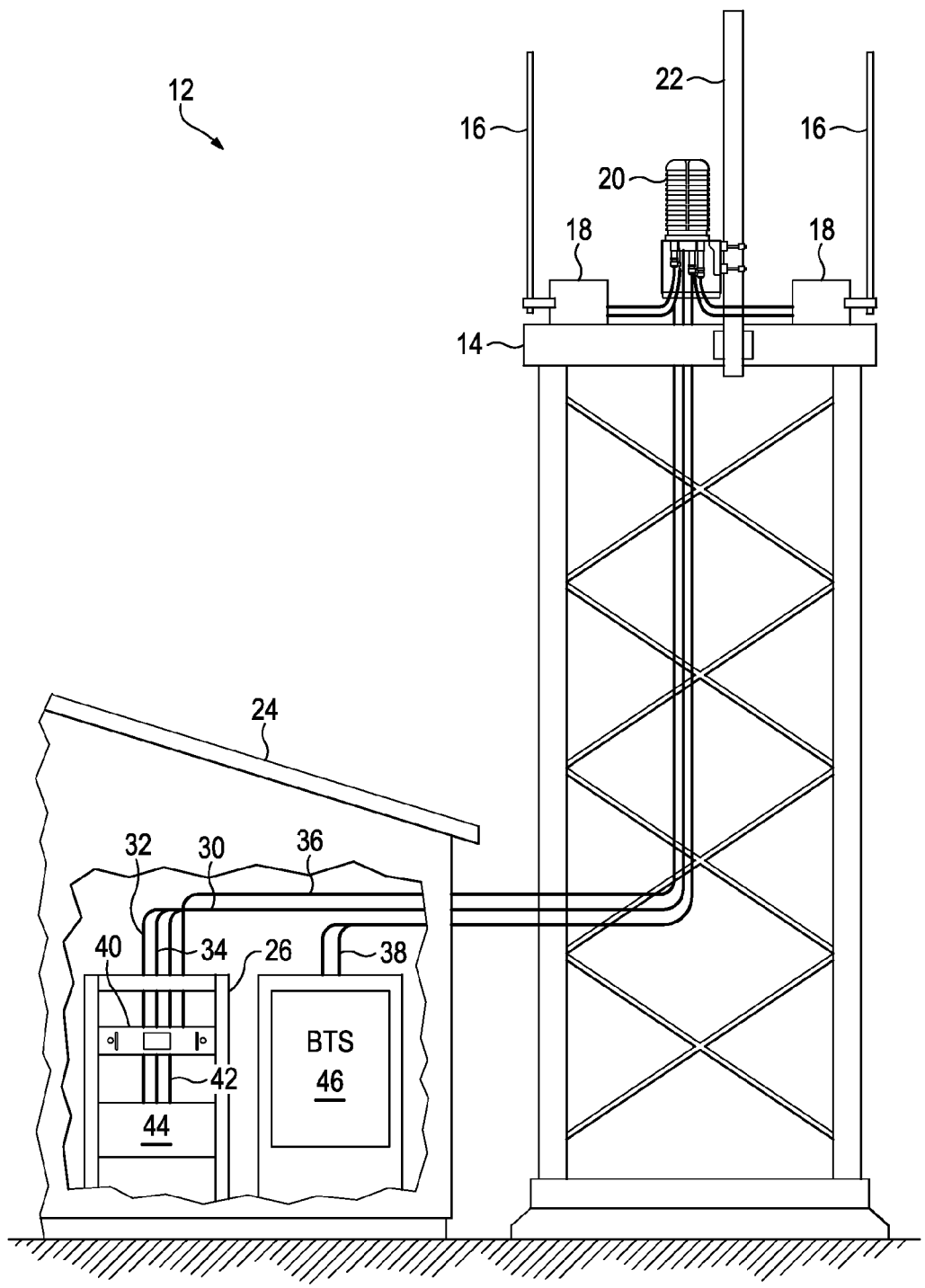
FIG. 1 shows a suppression system used with a remote radio head-based wireless communication system.

FIG. 1 illustrates one example of a suppression system 12 that provides suppression for a distributed wireless communication station. A building 24 contains computing equipment for a base transceiver communication station (BTS) 46. Communication station 46 is connected through fiber optic cables 38 to different radios 18 located on the top of a tower 14. A Direct Current (DC) power plant 44 is connected through a DC power bus 42 and DC power cables 30 to the different radios 18 on tower 14. In one example, DC power cables 30 include sets of −48 DC volt power cables 32, return power cables 34, and associated ground cables that extend out of building 24 and run up tower 14 to different associated radios 18. Radios 18 are connected to associated antennas 16.

A remote suppression unit 20 is attached to a support 22 on top of tower 14 and is connected to the remote ends of power cables 30 proximate to radios 18 and antennas 16. In one example, remote suppression unit 20 is located within 2 meters of radios 18. A local rack based suppression unit 40 is located inside of building 24 and is connected to the opposite local ends of power cables 30 relatively close to DC power plant 44 and communication station 46. In one embodiment, suppression unit 40 is located in a rack 26 that also contains DC power plant 44. In another example, suppression unit 40 is located in another rack or some other location next to power plant 44.

A monitor cable 36 may connect monitoring circuitry in rack suppression unit 40 to monitoring circuitry in remote suppression unit 20. Monitor cable 36 may include any combination of wires that identify different alarm and voltage conditions within remote suppression unit 20. For example, a first alarm wire in cable 36 may identify a failure of a suppression device within remote suppression unit 20. A second alarm wire may identify intrusion into remote suppression unit 20. A third alarm wire in cable 36 may identify water infiltration within remote suppression unit 20. Other wires in monitoring cable 36 or in separate monitoring cables may identify remote voltage levels within remote suppression unit 20.

In one example, radios 18 may be located outside of building 24, but relatively close to rack suppression unit 40. For example, radios 18 may be located on the top of a building that also houses DC power plant 44 and communication station 46. In this example, suppression unit 40 still may be located in rack 26. However, remote suppression units 20 may or may not be used for connecting to the opposite ends of power cables 30 outside of building 24.

In another configuration, radios 18 and associated antennas 16 are located at different corners on the roof of a building. Individual suppression boxes can be connected to individual DC power cables 30 close to different radios 18 on the roof of the building. Each of the boxes may contain suppression devices for one or a few power cables and associated radios. In this configuration rack suppression unit 40 still may be used but suppression boxes located on the roof may be configured differently than the suppression units 20 shown below.

In another example, individual suppression boxes are connected to the individual DC power cables 30 and located next to the associated radios 18 on the roof of the building. A separate fiber/power connector on the top of the building provides a junction between the DC power cables 30 and fiber optic cables 38 extending inside the building and jumper cables that connect to the radios 18.

In another example, different radios 18 are located relatively close to each other, and remote suppression units 20 are used both for containing suppression devices and as a junction box for fiber optic cable jumpers that are distributed out to radios 18. In another example, remote suppression units 20 may only operate as junction boxes for DC power cables 30 and/or fiber optic cables 38. The same rack suppression unit 40 may be located in building 24 and may have a same or different suppression configuration than the configuration shown below.

Figure 2:
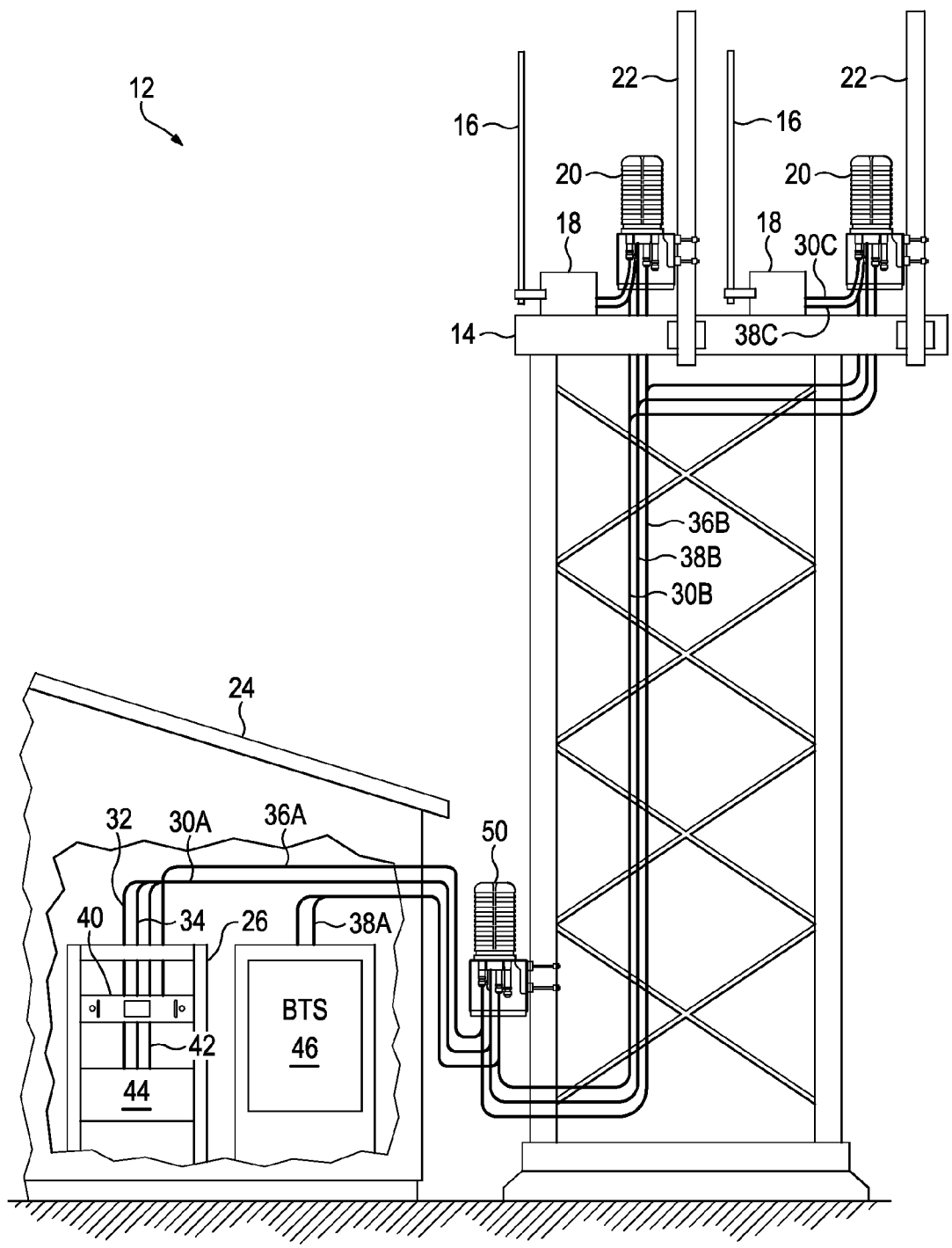
FIG. 2 shows a suppression system that includes a base suppression unit.

FIG. 2 depicts a second example suppression system 12. In this example, multiple remote suppression units 20 are located on tower 14. Each remote suppression unit 20 may provide power jumper cables 30C and fiber optic jumper cables 38C to an associated set of radios 18 and provide surge suppression for two different radios 18. However, any number of remote suppression units 20 may include any number of suppression devices for connecting to any number of radios 18. In one example, each remote suppression unit 20 is associated with a sector.

Remote suppression units 20 may connect to DC power plant 44 via a base suppression unit 50. For example, a first set of DC power cables 30A, fiber optic cables 38A, and monitoring cables 36A may be connected between rack suppression unit 40 and base suppression unit 50. A second set of DC power cables 30B, fiber optic cables 38B, and sensor cables 36B may be connected between base suppression unit 50 and different remote suppression units 20.

In another example, base suppression unit 50 may contain suppression devices. In this example, rack suppression unit 40 might not include suppression devices and DC power cables 30 may connect from DC power plant 44 directly to base suppression unit 50. In another example, base suppression unit 50 may include connectors but no suppression devices. Base suppression unit 50 may operate as a terminal box for connecting DC power cables 30A to DC power cables 30B, connecting fiber optic cables 38A to fiber optic cables 38B, and connecting monitoring cables 36A to monitoring cables 36B. In any of these examples, base suppression unit 50 may include display circuitry for displaying alarm and/or voltage conditions detected remotely in remote suppression units 20 or detected locally in base suppression unit 50.

Remote Suppression Unit

Figure 3:
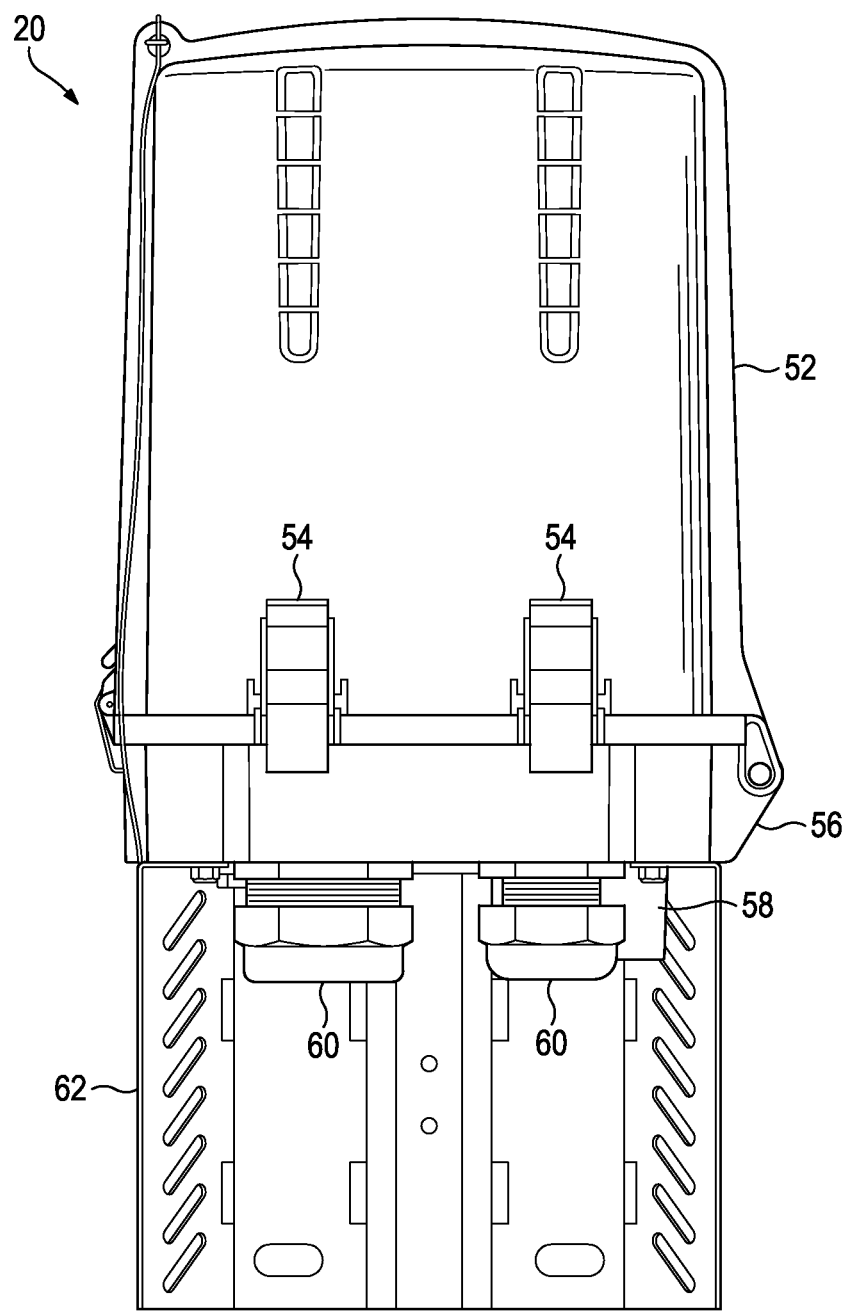
FIG. 3 shows a remote suppression unit.

FIG. 3 shows in more detail one of remote suppression units 20. A plastic lid 52 sits over a base 56. Latches 54 hold lid 52 in compression onto base 56. In one example, the entire remote suppression unit 20 is around 13 inches or 340 millimeters (mm) tall and is around 11 inches or 281 mm wide. Of course remote suppression unit 20 can be other dimensions based on different suppression requirements.

Ports 60 extend vertically up through base 56 and receive the DC power cables, fiber optic cables, and/or monitoring cables described above. In one example, ports 60 may comprise round tubes formed from plastic, such as a semi-flexible polyvinyl chloride (PVC) material. Ports 60 may include water tight glands configured per cable vendor specifications for preventing water to access the interior of remote suppression unit 20.

A mounting bracket 62 attaches to the support pole shown above in FIGS. 1 and 2. Alternatively, mounting bracket 62 may attach to a wall or to a pole that extends up from the top of a roof. Mounting bracket 62 includes a mounting platform that attaches to the bottom of base 56 and holds remote suppression unit 20 in a vertical elevated position.

Figure 4:
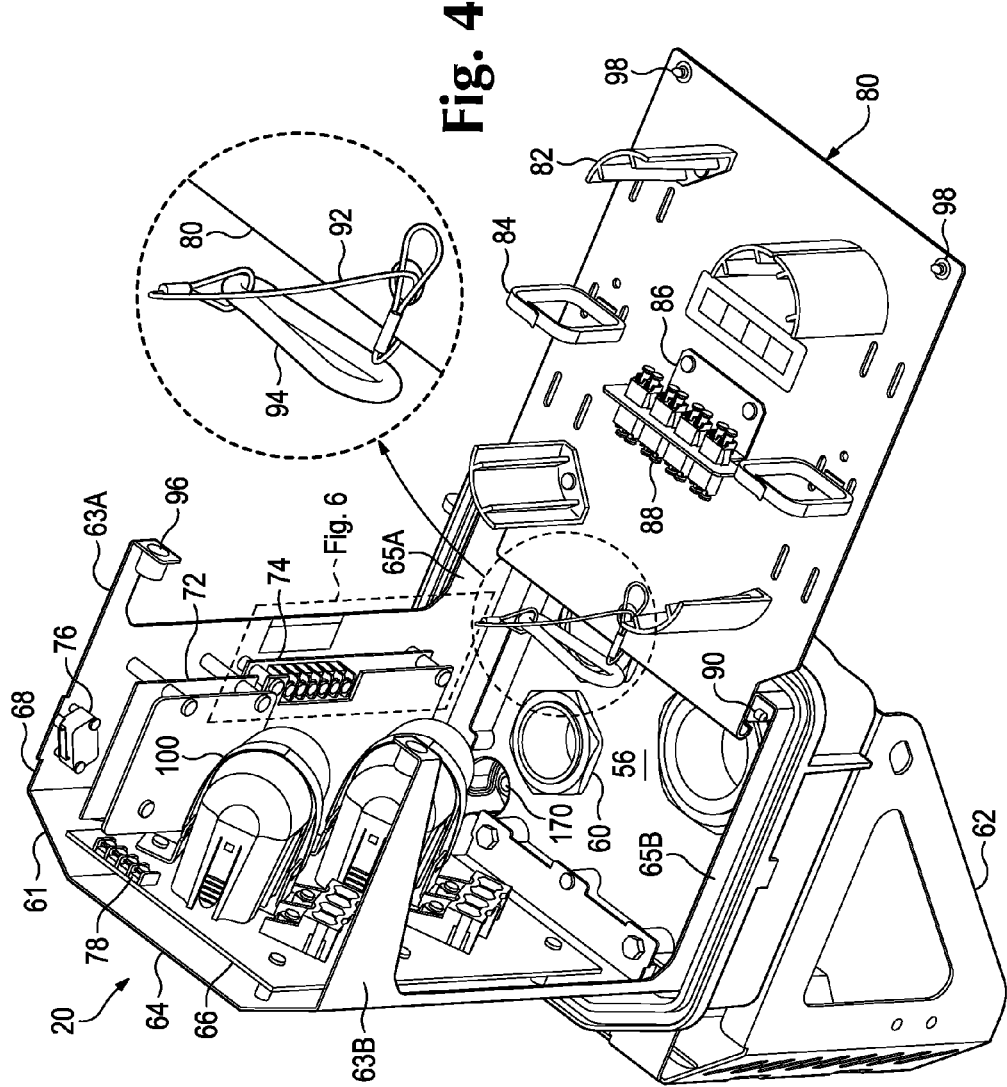
FIG. 4 shows the remote suppression unit of FIG. 3 with a lid removed.

FIG. 4 is a perspective view of remote suppression unit 20 with lid 52 removed. A shell 61 attaches on top of base 56. Shell 61 includes a back wall 64 that extends vertically upward from a back end and supports an over-voltage protection (OVP) printed circuit board 66. A side wall 68 extends vertically forward from a first side of back wall 64 and retains monitor printed circuit boards 72 and 74. A lower support arm 65A and an upper support arm 63A both extend forward from side wall 68 toward a front end of base 56. A lower support arm 65B and an upper support arm 63B extend forward from a second side of back wall 68 toward a front end of base 56.

Suppression modules 100 are attached to OVP board 66 and provide suppression protection for radios located proximate to remote suppression unit 20. Suppression modules 100 are described in more detail below in FIGS. 9 and 10 and are also described in co-pending U.S. patent application Ser. No. 13/301,685 which has been incorporated by reference in its entirety.

A fold-out panel 80 is rotatably attached to the front ends of lower arms 65A and 65B. For example, pins 90 may extend outward from opposite bottom ends of panel 80 and insert into holes located in the front ends of lower support arms 65A and 65B. In the folded-out position shown in FIG. 4, a back side of panel 80 extends upward and contains a fiber optic cable tray 86 that retains fiber optic adapters 88.

An installer may remove panel 80 from lower arms 65 when installing power cables onto printed circuit board 66. For example, the installer may extract pins 90 from the holes in lower support arms 65. Panel 80 then hangs below base 56 by a lanyard 92 that is attached to a carabiner 94 that is attached to the top side of base 56. Dangling panel 80 provides more accessibility to the front end of suppression unit 20.

After the power cables and monitoring cables are installed inside of suppression unit 20, the installer may reattach panel 80 to the front ends of lower support arms 65. The installer inserts the fiber optic cables from the communication station up through one of ports 60 and plugs the fiber optic cables into the bottom ends of adapters 88. The installer then plugs first ends of fiber optic jumper cables into top ends of adapters 88 and connects second ends of the fiber optic jumper cables to the radios. Excess fiber optic cable is wrapped around supports 82 and 84.

The installer rotates panel 80 upward and inserts screws 98 on a top end of panel 80 into threaded holes 96 located on the front ends of upper support arms 63. Panel 80 is removed and/or folded-out to provide easier installation of power, fiber optic, and monitoring cables within suppression unit 20. Folding panel 80 up against upper support arms 63 then reduces the overall footprint and wind load of suppression unit 20.

An intrusion sensor 76, such as a proximity switch, detects access into suppression unit 20. Intrusion sensor 76 rotates upward when lid 52 in FIG. 3 is lifted off of base 56 and rotates downward when lid 52 is attached onto base 56. Intrusion sensor 76 is electrically connected to monitor boards 72 and 74 and generates an alarm signal when lid 52 is removed.

A terminal strip 78 is attached to OVP board 66 and connects to voltage sense lines that are run down to the base suppression unit or rack suppression unit. The voltage sense lines carry a low current version of the voltage at the remote ends of power cables 30 connected to suppression modules 100.

Figure 5:
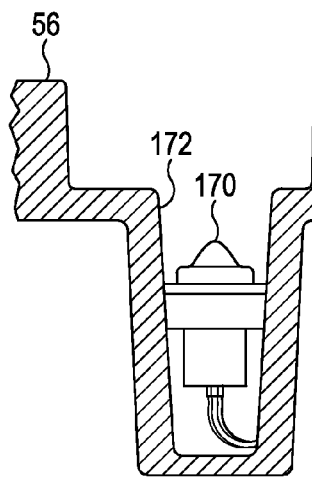
FIG. 5 shows a water sensor used in the remote suppression unit of FIG. 4.

Referring to FIGS. 4 and 5, a water sensor 170 is located within a reservoir 172 that extends down below base 56. Water sensor 170 detects water that may infiltrate the internal compartment of remote suppression unit 20. For example, a signal is generated in response to water contacting a top end of water sensor 170. The water detection signal may activate an LED on monitor board 74 and generate an alarm signal that is sent down to base suppression unit 50 in FIG. 2, and/or at rack suppression unit 40 in FIGS. 1 and 2.

Figure 6:
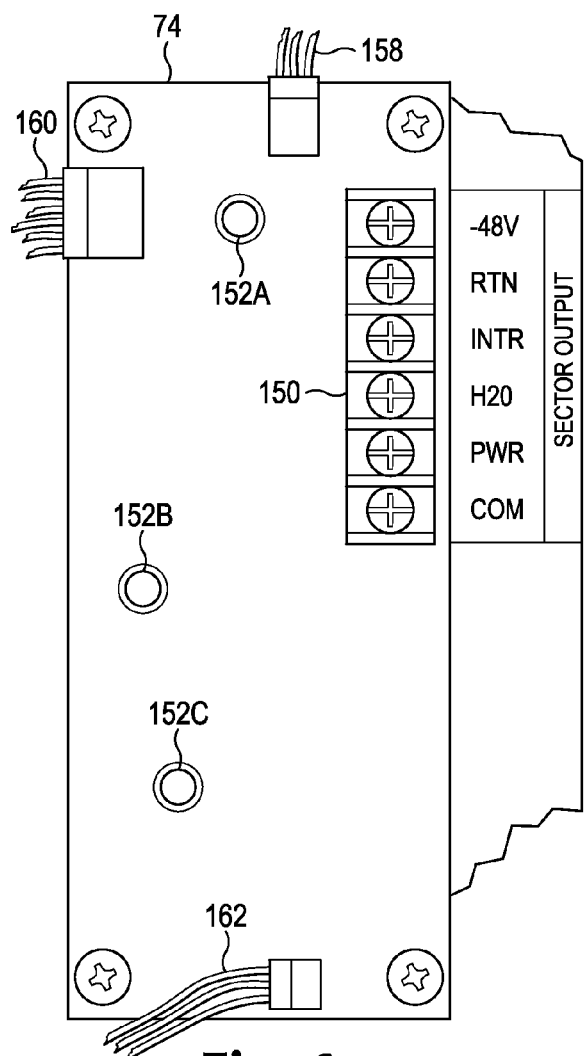
FIG. 6 shows a monitor board used in the remote suppression unit of FIG. 3.

Referring to FIGS. 4 and 6, wires 158 connect monitor board 74 to intrusion sensor 76. Wires 160 connect monitor board 74 to the DC power cables and suppression modules 100, and wires 162 connect monitor board 74 to water sensor 170. Monitor board 74 includes a light emitting diode (LED) 152A activated by intrusion sensor 76 when lid 52 is removed from base 56. A LED 152B is activated in response to a failure in one of suppression modules 100 or when a voltage on the power cables is below a threshold value. A LED 156 is activated in response to water sensor 170 detecting water within suppression unit 20.

Alarm terminal strip 150 includes contacts for sending alarm signals to other monitoring circuits in the suppression system. For example, an INTR terminal connects to a first alarm wire and generates an intrusion alarm signal in response to activation of intrusion sensor 76. A H2O terminal connects to a second alarm wire and generates a water detection alarm signal in response to activation of water sensor 170. A PWR terminal connects to a third alarm wire and generates a suppression device failure alarm in response to monitor board 74 detecting a failure in one of suppression modules 100.

Figure 7:
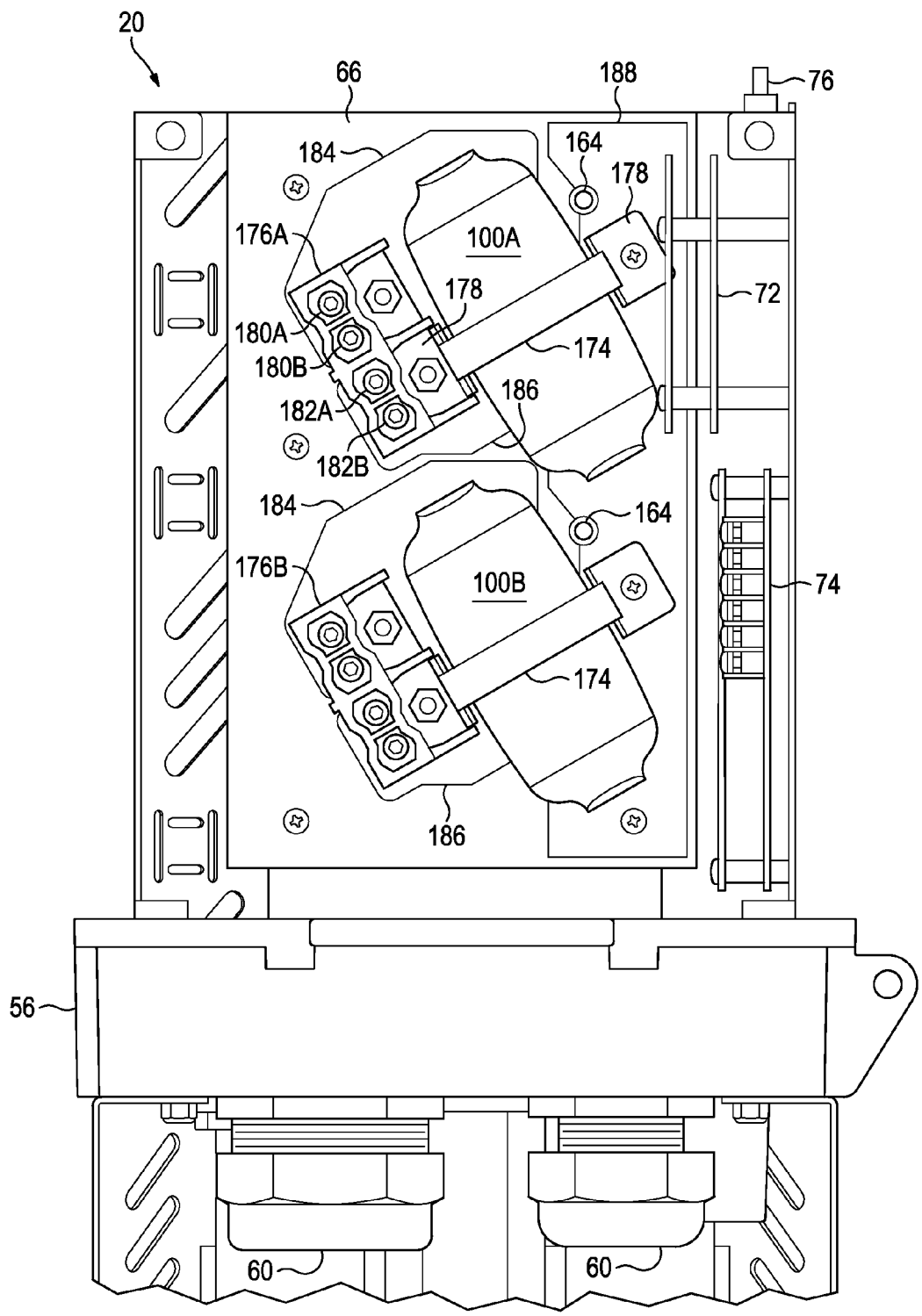
FIG. 7 shows a front elevation view of the remote suppression unit of FIG. 3.

FIG. 7 depicts an example front view of remote suppression unit 20. A first connector 176A includes a first terminal 180A that connects to a first −48 VDC power cable and a second terminal 180B that connects to a −48 VDC jumper cable that connects to one of the radios 18 in FIG. 1 or 2. Connector 176A also includes terminal 182A that connects to a return power cable and a terminal 182B that connects to a return power jumper cable that connects to one of the radios 18.

Terminals 180A and 180B are connected to a −48 VDC power strip 184 formed on OVP board 66. Terminals 182A and 182B are connected to a return power strip 186 formed on OVP board 66. A −48 VDC bus bar extends from suppression module 100A and inserts into a clip connected to −48 VDC power strip 184 and a return bus bar extends from suppression module 100A and inserts into a clip connected to return power strip 186. Separate power strips 184 and 186 are connected to each suppression module 100. A second connector 176B connects to the −48 VDC power strip and return power strip connected to suppression module 100B. A ground strip 188 extends along the bottom and right side of OVP board 66 and connects to clips that receive ground bus bars in suppression modules 100A and 100B.

A strap 174 is attached to cleats 178. One of cleats 178 is attached to connector 176 and a second cleat 178 is connected to ground strip 188 on OVP board 66. Strap 174 may comprise Velcro®, another hook and eye fabric, or any other material for holding suppression module 100 onto circuit board 66. LEDs 164 are located next to each suppression module 100A and 100B and are activated when one of suppression modules 100 is sacrificed as a result of a surge event.

Figure 8:
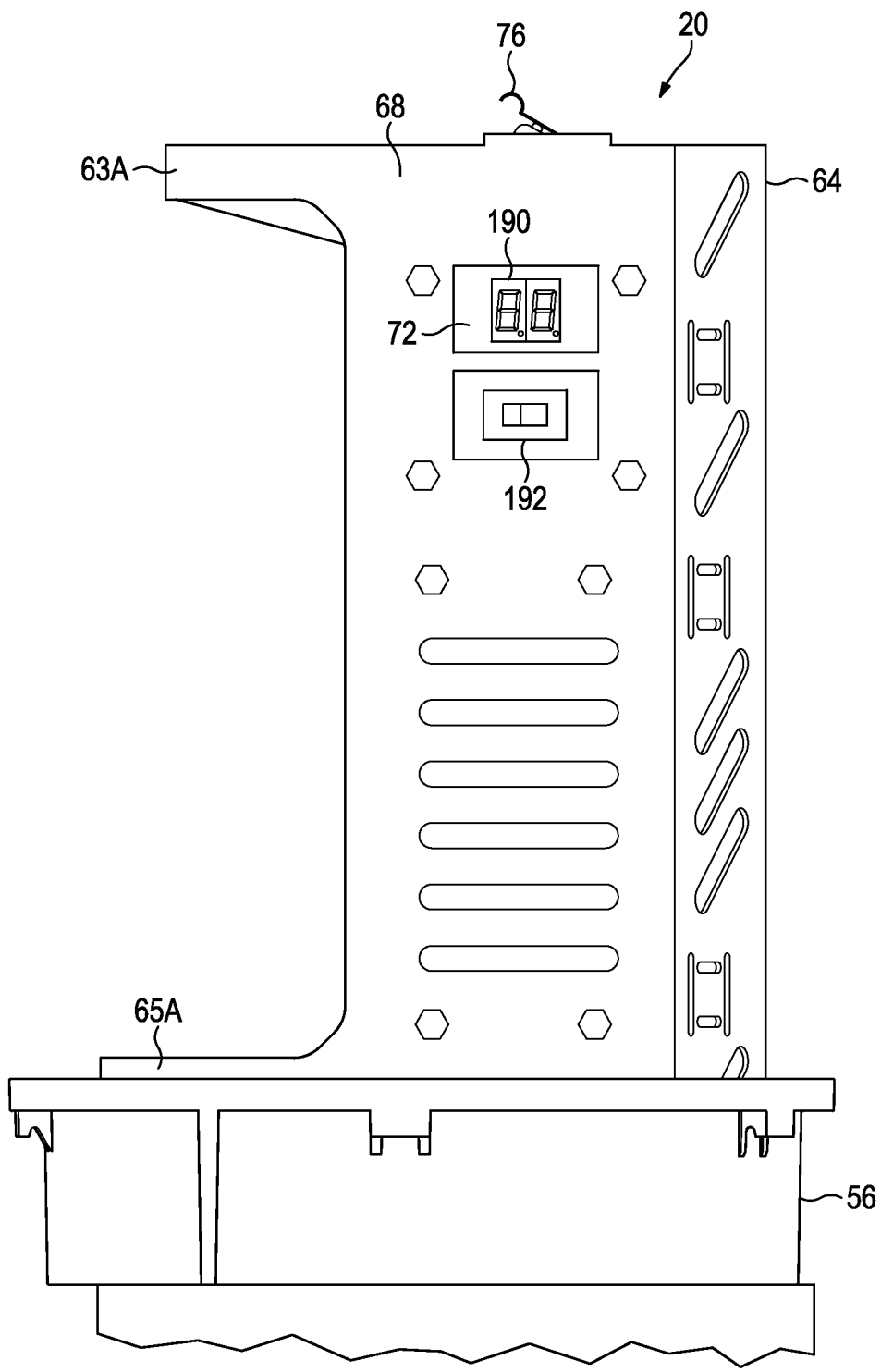
FIG. 8 shows a side elevation view of the remote suppression unit of FIG. 3.

FIG. 8 depicts a side view of remote suppression unit 20. A display 190 and a switch 192 are attached to monitor board 72. Moving switch 192 to a first position causes display 190 to display the remote voltage connected to suppression module 100A in FIG. 7 and moving switch 192 to a second position causes display 190 to display the remote voltage connected to suppression modules 100B in FIG. 7. The voltages identified on display 190 allow the installer to confirm that the correct −48 VDC voltage is provided to remote suppression unit 20 and that both suppression modules 100 are operating correctly. For example, if one of suppression modules 100 fails, display 190 may not identify the correct −48 VDC voltage level. LED 152B in FIG. 6 and LEDs 164 in FIG. 7 also identify properly operating suppression modules 100.

Figure 9:
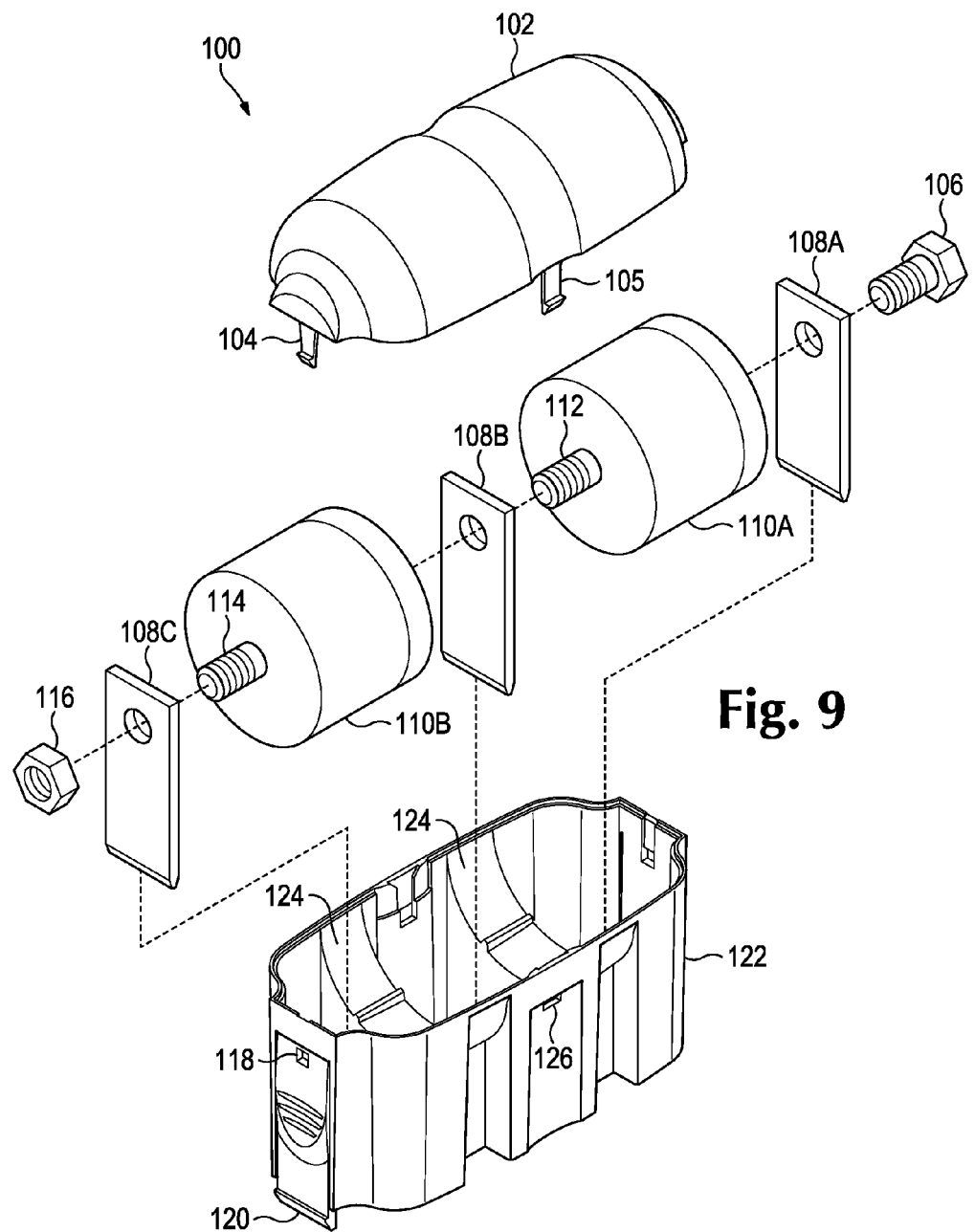
FIG. 9 shows an exploded view of a surge suppression module.

FIG. 9 shows an exploded perspective view for one of suppression modules 100 located on OVP board 66. A first suppression device 110A is connected by a bolt 106 at one end to a bus bar 108A. A connecting member 112 extends out a second end of suppression device 110A and inserts through a hole in a second bus bar 108B and into a threaded hole on a first side of a second suppression device 110B. A second end of suppression device 110B includes a connecting member 114 that inserts through a hole in a third bus bar 108C and threadingly engages with a nut 116. Bus bars 108 in one example have a substantially flat rectangular profile and may have oppositely inclining front and back faces that form a wedge at a bottom end.

Mounting base 122 has an oval cross-sectional shape and is configured to receive suppression devices 110A and 110B. Two semi-circular supports 124 have a shape and size similar to the circular circumference of suppression devices 110 enabling suppression devices 110A and 110B to sit snugly or snap into supports 124. Mounting base 122 may be made from a polymeric material and includes two clips 120 extending down from opposite lateral sides that insert into slots formed in OVP board 66. Clips 120 can be compressed laterally inward and may springingly extend back outward toward an original position.

A cap 102 may also be made from a polymeric material, extends over suppression devices 110, and connects to mounting base 122. Cap 102 includes clips 105 in a front and back end that insert into holes 126 formed on the front and back sides of mounting base 122. Two clips 104 extend down from lateral sides of cover 102 and insert into holes 118 formed on the lateral sides of mounting base 122.

Figure 10:
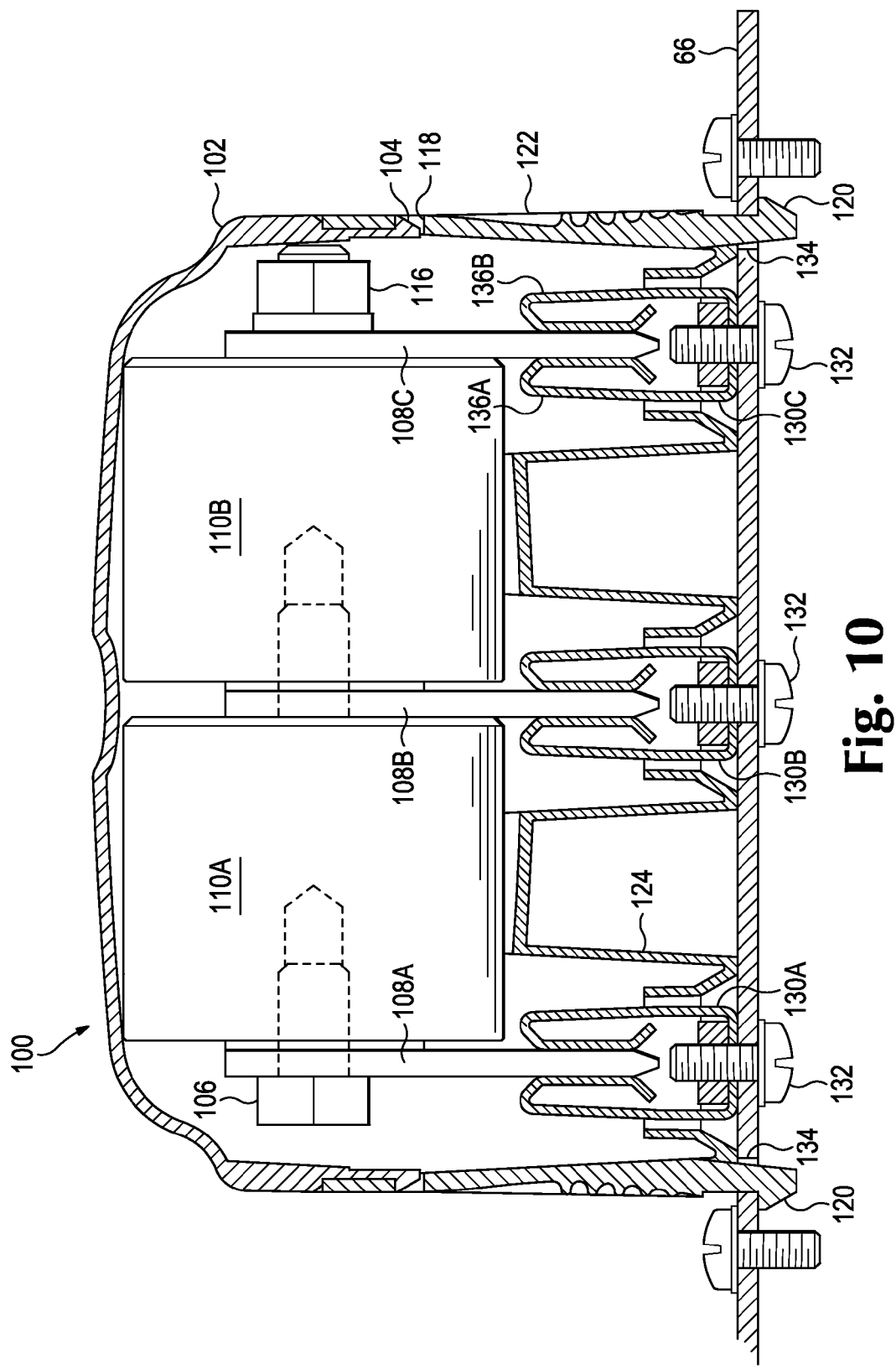
FIG. 10 shows a front sectional view of the surge suppression module.

FIG. 10 is a front sectional elevation view of suppression module 100. Clips 130A, 130B, and 130C are attached to the −48 VDC power strip 184, return power strip 186, and ground strip 188 in FIG. 7. Clips 130 are attached to OVP board 66 with screws 132.

Clips 120 are both pressed inward and inserted into slots 134 in printed circuit board 66. Clips 120 are released and spring back outward pressing against an outer side of slots 134. While mounting base 122 is being attached to OVP board 66, the bottom ends of bus bars 108A, 108B, and 108C insert in-between spring arms 136A and 136B of clips 130A, 130B, and 130C, respectively.

Suppression module 100 can be plugged into and detached from OVP board 66 without any tools. For example, suppression module 100 is removed by pressing clips 120 inward. The suppression devices 110A and 110B are lifted upward by supports 124 and bus bars 108 are similarly lifted up and out from in-between clips 130. Thus, an operator simply has to squeeze and lift the sides of mounting base 122 to detach suppression module 100 from OVP board 66.

Base Suppression Unit

Figure 11:
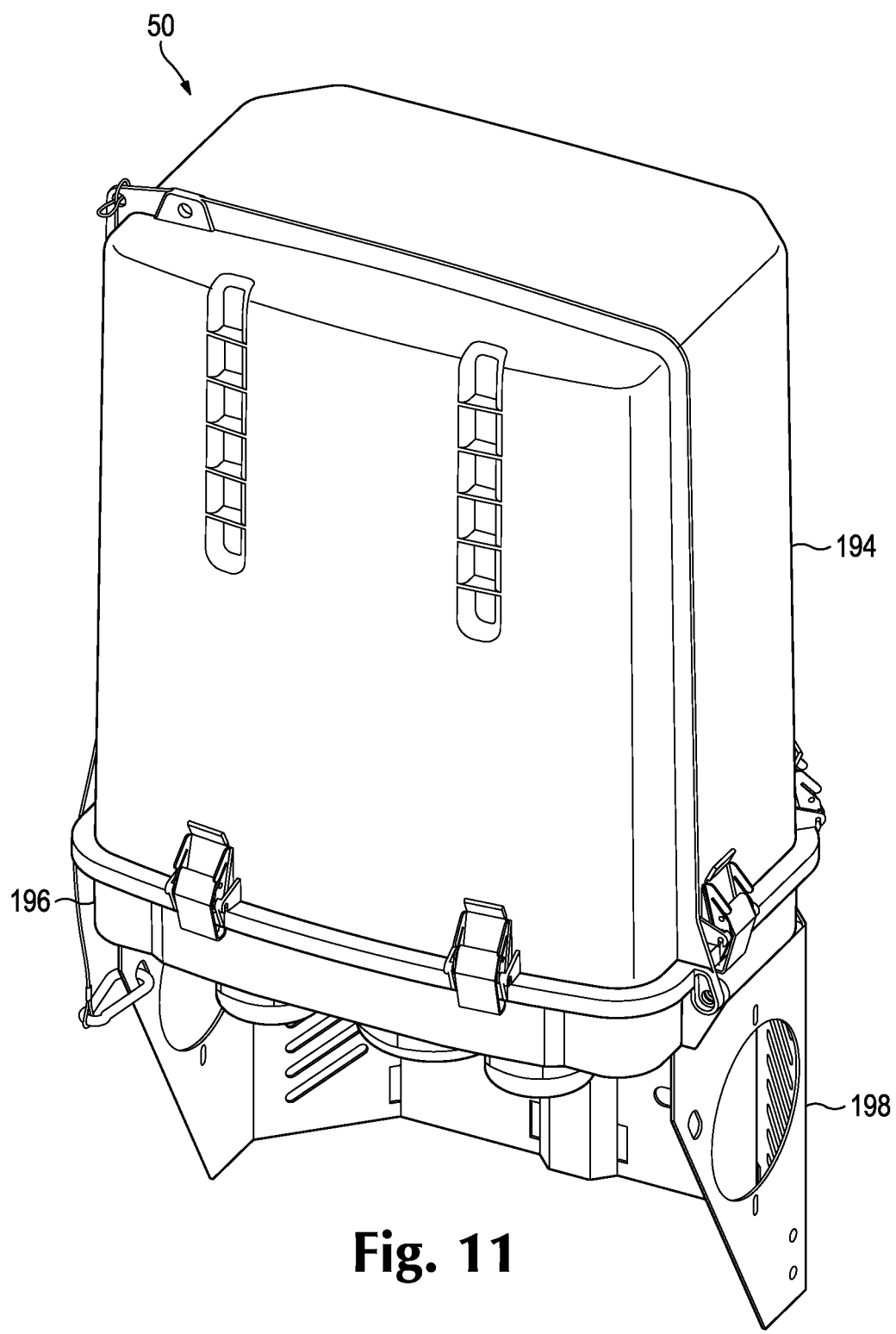
FIG. 11 shows a perspective view of a base suppression unit.

FIG. 11 depicts an example perspective view of base suppression unit 50 previously shown in FIG. 2. Base suppression unit 50 includes a base 196 supported by a bracket 198. A lid 194 attaches onto base 196. Base suppression unit 50 may have substantially the same shape and may contain many of the same components that were previously shown for remote suppression unit 20. However, base suppression unit 50 may have larger dimensions than remote suppression unit 20. For example, base suppression unit 50 may be around 19.5 inches or 494 millimeters (mm) tall and be around 11.6 inches or 294 mm wide. Of course base suppression unit 50 can also be other dimensions.

Figure 12:
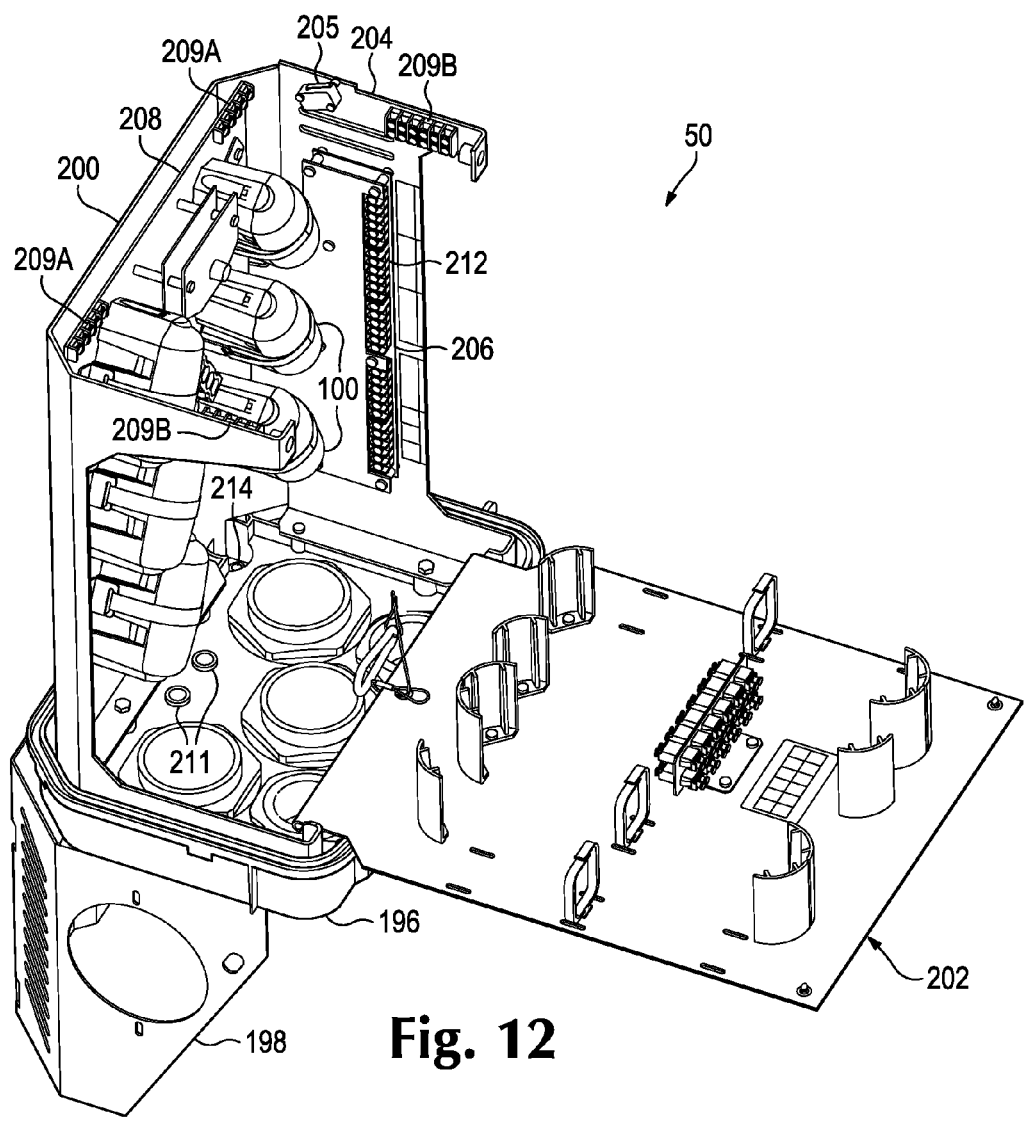
FIG. 12 shows a perspective view of the base suppression unit of FIG. 11 with the lid removed.

FIG. 12 depicts an example, perspective view of base suppression unit 50 without lid 194. Base suppression unit 50 includes a shell 200, OVP board 208, and panel 202 similar to shell 61, OVP board 66, and panel 80, respectively, previously shown in FIG. 4. Other similar components within base suppression unit 50 are not described in further detail.

OVP board 208 in base suppression unit 50 may retain more suppression modules 100 than remote suppression unit 20. In one example, OVP board 208 may retain up to six suppression modules 100. In another example, no suppression modules 100 are attached to OVP board 208 and base suppression unit 50 operates as a terminal box and/or a monitoring station. Vents 211 extend up through base 196 and include a Gore-tex® type material that allows the inside compartment of base suppression unit 50 to breath while preventing water access.

Two terminal strips 209A are attached to opposite sides of OVP board 208. Terminal strips 209A connect to voltage sense lines that identify the −48 VDC voltages supplied to each suppression module 100. Two terminal strips 209B are attached to opposite upper arms of shell 200. Terminal strips 209B operate as a pass-thru for connecting to voltage sense lines received from remote suppression units 20.

Figure 13:
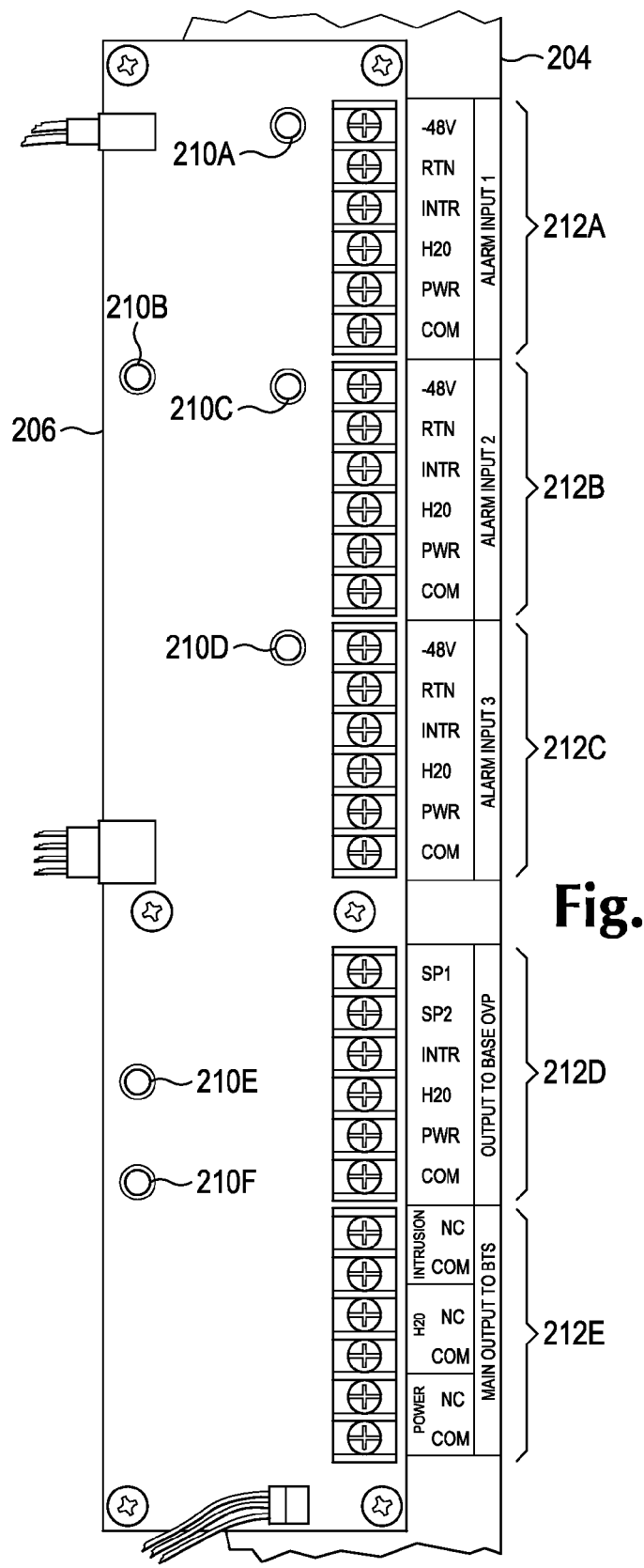
FIG. 13 shows how a monitor board located within the base suppression unit of FIG. 11.

Referring to FIGS. 12 and 13, monitor board 206 is attached to side wall 204 of shell 202. Monitor board 206 includes different terminal strips 212 associated with remote and local alarm signals. For example, terminal strip 212A includes an intrusion terminal, a H2O terminal, and a power terminal Alarm wires connect terminals on terminal strip 212A to corresponding terminals on terminal strip 150 in remote suppression unit 20 shown in FIG. 6. A second set of alarm wires may connect a second terminal strip 212B to corresponding alarm terminals on a second remote suppression unit 20. A third set of alarm wires may connect a third terminal strip 212C to corresponding alarm terminals in a third suppression unit 20.

Terminal strip 212D outputs alarm signals for local alarm conditions within base suppression unit 50. Terminal strip 212D operates similar to alarm terminal strip 150 in FIG. 6. For example, an INTR terminal generates an intrusion alarm signal in response to activation of intrusion sensor 205. A H2O terminal generates a water detection alarm signal in response to activation of water sensor 214. A PWR terminal on terminal strip 212D generates a power/OVP alarm signal in response to a detected failure in one of suppression modules 100. Terminal strip 212E is connected to relays that activate in response to any of the remote or local intrusion, H2O, or power/OVP alarm signals described above.

LEDs 210 identify any of the local or remote alarm conditions. For example, LED 210A identifies an alarm condition for a first remote suppression unit 20 associated with a first sector location A. An LED 210C identifies an alarm condition for a second remote suppression unit 20 associated with a second sector location B. An LED 210D indicates an alarm condition for a third remote suppression unit 20 associated with a third sector location C.

An LED 210B indicates a power/over voltage protection failure for the associated local or remote sector, an LED 210E indicates an intrusion condition for the associated local or remote sector, and an LED 210F indicates a water detection condition for the associated local or remote sector. For example, monitor board 206 may activate LED 210C indicating an alarm condition detected by the remote suppression unit 20 associated with sector B. Alarm board 206 also may activate LED 210F indicating that the water sensor has detected water within the remote suppression unit 20 in sector B.

A local alarm condition is indicated when none of LEDs 210A, 210C, or 210D are activated. For example, monitor board 2096 may activate LED 210E and not activate any of LEDs 210A, 210C, or 210D. This indicates an intrusion into base suppression unit 50.

Figure 14:
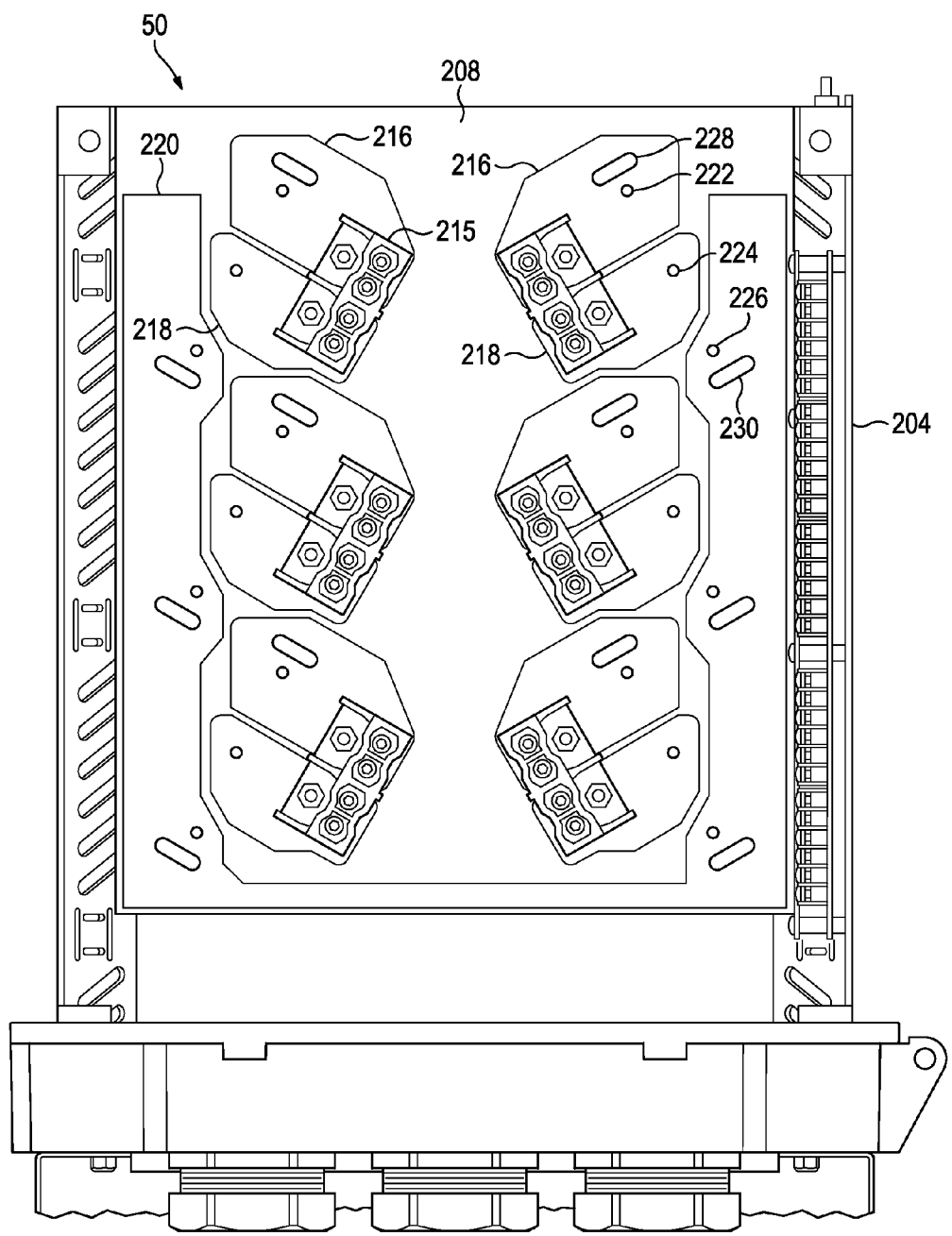
FIG. 14 shows a front elevation view of the base suppression unit with no suppression modules.

FIG. 14 depicts a front view of base suppression unit 50 with no suppression modules attached to OVP board 208. In one example, suppression modules are not used and base suppression unit 50 operates as a terminal box and/or monitoring station. In another example, up to six suppression modules 100 are connected to OVP board 208 as previously shown in FIG. 12. In this configuration, base suppression unit 50 may be located proximate to radios and operate as a remote suppression unit.

In another example, base suppression unit 50 may provide the local suppression modules that otherwise would have been located in rack suppression unit 40 in FIGS. 1 and 2. In yet another example, base suppression unit 50 may contain suppression modules that provide remote suppression protection for additional radios in addition to the radios attached to the remote suppression units 20.

A connector 215 is similar to connector 176 previously shown in FIG. 7. A first pair of terminals from connector 215 connect a −48 VDC power cable and a −48 VDC jumper cable to a −48 VDC power strip 216 on OVP board 208. A second pair of terminals on connector 215 connects a return VDC power cable and a return VDC jumper cable to a return power strip 218 on OVP board 208. A ground strip 220 extends up along the sides and along the bottom of OVP board 208.

Referring to FIGS. 9, 10 and 14, when populated with one or more suppression modules 100, a first clip is attached to a first hole 222 in −48 VDC power strip 216 and a second clip is attached to a second hole 224 in return power strip 218. A third clip is attached to a third hole 226 in ground strip 220. A −48 VDC bus bar 108A in suppression module 100 inserts into the first clip, a return bus bar 108B in suppression module 100 inserts into the second clip, and a ground bus bar 108C in suppression module 100 inserts into the third clip. Suppression module 100 includes a mounting base 122 that has two plastic clips 120 that insert into slots 228 and 230 formed in circuit board 208.

Rack Suppression Unit

Figure 15:
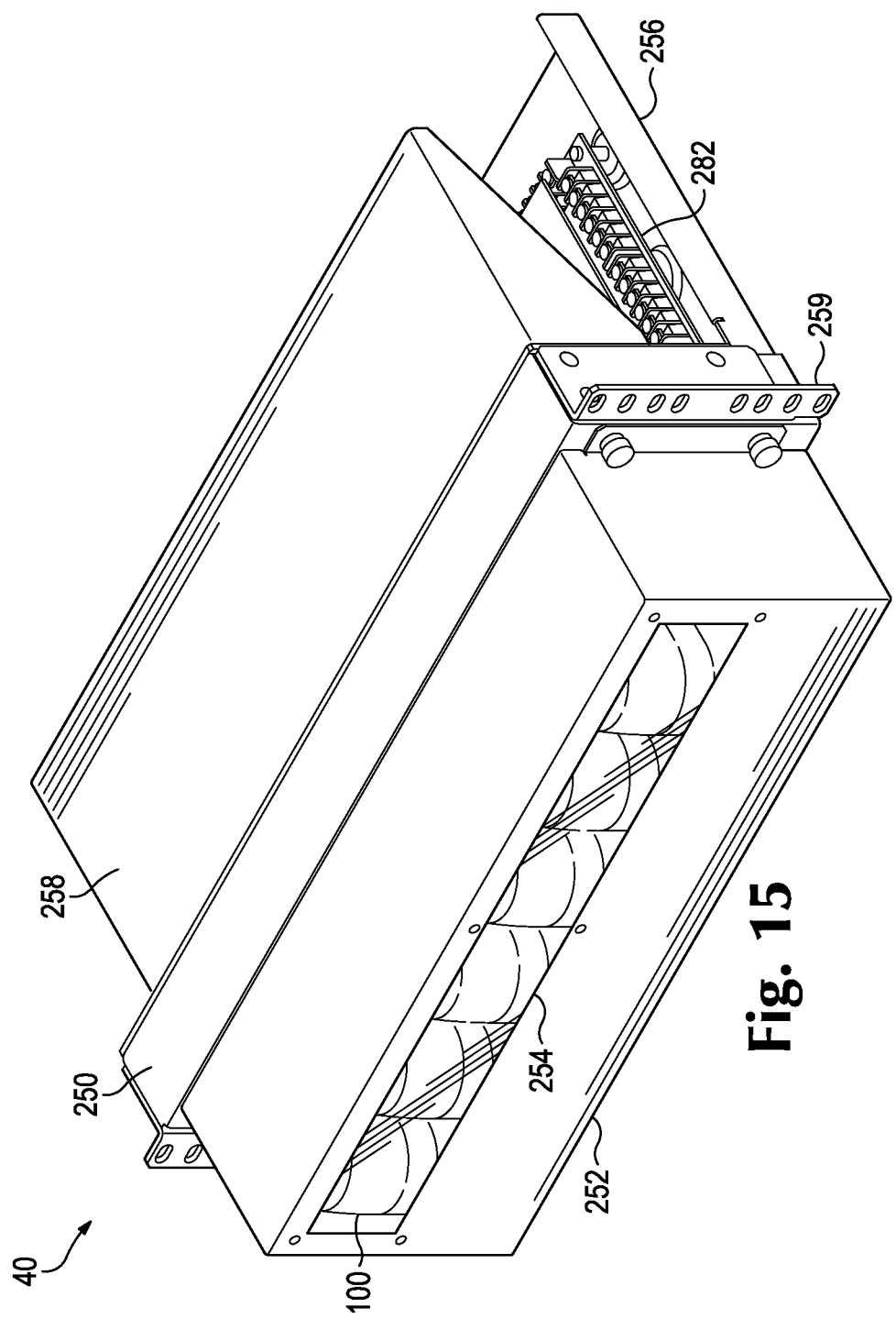
FIG. 15 shows a perspective view for a rack suppression unit.

FIG. 15 shows a front perspective view of rack based suppression unit 40 previously shown in FIGS. 1 and 2. Rack suppression unit 40 includes a frame 250 that connects to rack 26 that also supports DC power plant 44. The front of frame 250 retains an overvoltage protection (OVP) board that connects to suppression modules 100. A cover 252 extends over suppression modules 100 and attaches to the front of frame 250. A window 254 extends across the front of cover 252 and enables viewing of monitor circuitry that identifies alarm and voltage conditions for local and remote suppression units. Mounting ears 259 extend out from the sides of frame 250 and attach to rack 26 in FIG. 1. A bottom plate 256 extends from a rear bottom end of frame 250 and supports a monitor board 282. A hood 258 extends back from a rear top end of frame 250.

Rack suppression unit 40 has the advantage of having a conventional Rack Unit (RU) form factor that in one embodiment is a 2 RU enclosure that can fit into a 19 inch or 23 inch rack configuration. This allows rack suppression unit 40 to be mounted in the same rack 26 that holds the electronic circuitry for DC power plant 44 and/or holds the telecommunication circuitry for the BTS 24 shown in FIGS. 1 and 2. This allows rack suppression unit 40 to be connected closer to DC power plant 44 and communication station 46. Rack suppression unit 40 can be mounted onto any other rack or any other structure that may be housed in the building 24 shown in FIGS. 1 and 2, uses minimal space, and does not require a special mounting structure or rack.

Figure 16:
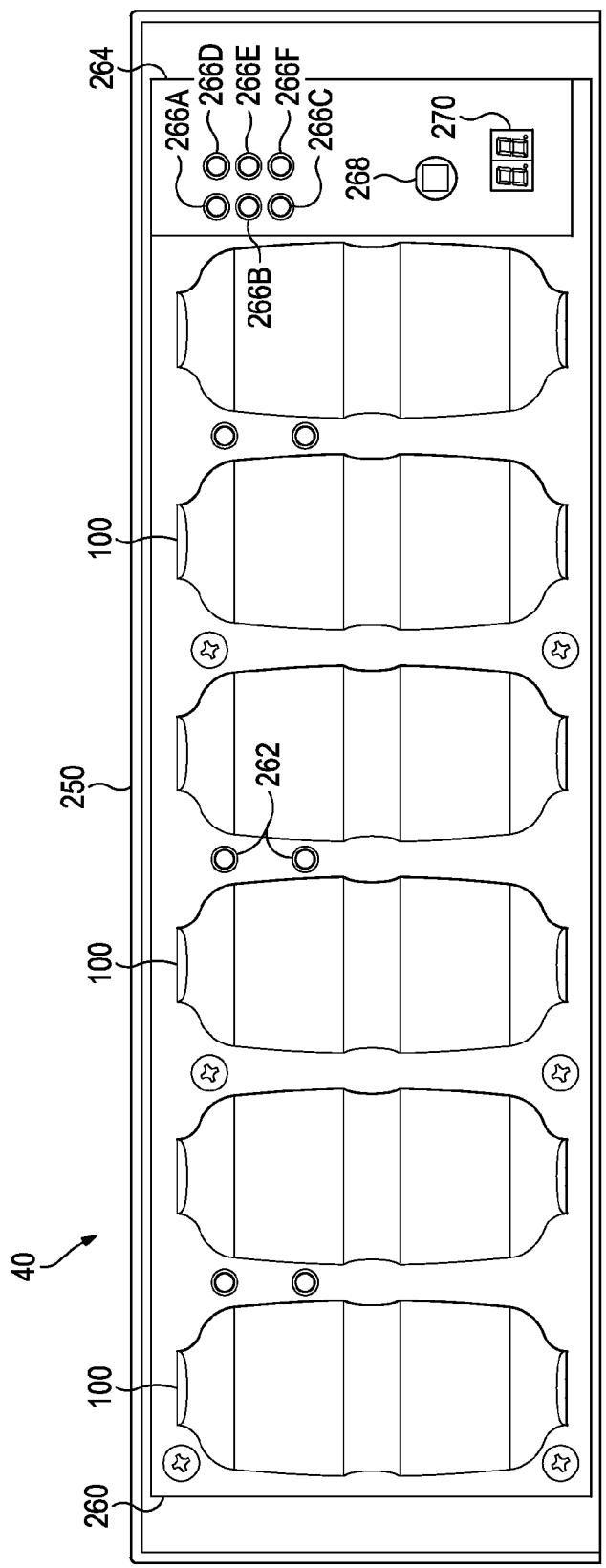
FIG. 16 shows a front elevation view for the rack suppression unit.

FIG. 16 depicts a front view of rack suppression unit 40 with a removed front cover. OVP board 260 attaches to a front face of frame 250. A monitor board 264 is attached on a right side of frame 250. Monitor board 264 includes LEDs 266 that identify alarm conditions for remote suppression units 20 located in different sectors and for local suppression modules 100. For example, monitor board 264 activates a first LED 266A in response to a water sensor sensing water in one of remote suppression units 20. Monitor board 264 activates a second LED 266B in response to an intrusion sensor detecting removal of a lid on either one of remote suppression units 20 or base unit 50. Monitor board 264 activates a third LED 266C in response to a failure of one or more suppression modules in one or more of remote suppression units 20, base suppression unit 50, and/or in rack suppression unit 40.

Monitor board 264 activates one of LEDs 266D-266F identifying which of the three different sectors are associated with the identified alarm condition. For example, activation of LED 266B and LED 266F may indicate an intrusion into remote suppression unit 20 in the third sector. In another example, monitor board 264 may activate LED 266C, but not activate any of LEDs 266D-266F, when an OVP failure is detected in one of suppression modules 100 located in rack suppression unit 50.

Monitor board 264 also includes a LED display 270 and a push button switch 268. Pushing switch 268 activates voltage measuring circuitry on monitor board 282 in FIG. 17 and displays a first upper voltage for a first circuit in the suppression system. For example, pressing switch 268 a first time may cause display 270 to show a first upper remote voltage at a first suppression module in one of remote suppression units 20 connected to the remote end of a power cable. Pressing switch 268 a second time may cause display 270 to show a second lower local voltage at a second suppression module 100 in rack suppression unit 40 connected to the lower local end of the same power cable.

Pressing switch 268 a third time may cause display 270 to show an upper remote voltage at a third suppression module located in one of remote suppression units 20 connected to the remote end of a second power cable. Pressing switch 268 a fourth time may cause display 270 to show a lower local voltage at a fourth suppression module 100 in rack suppression unit 40 connected to the lower local end of the second power cable.

Figure 17:
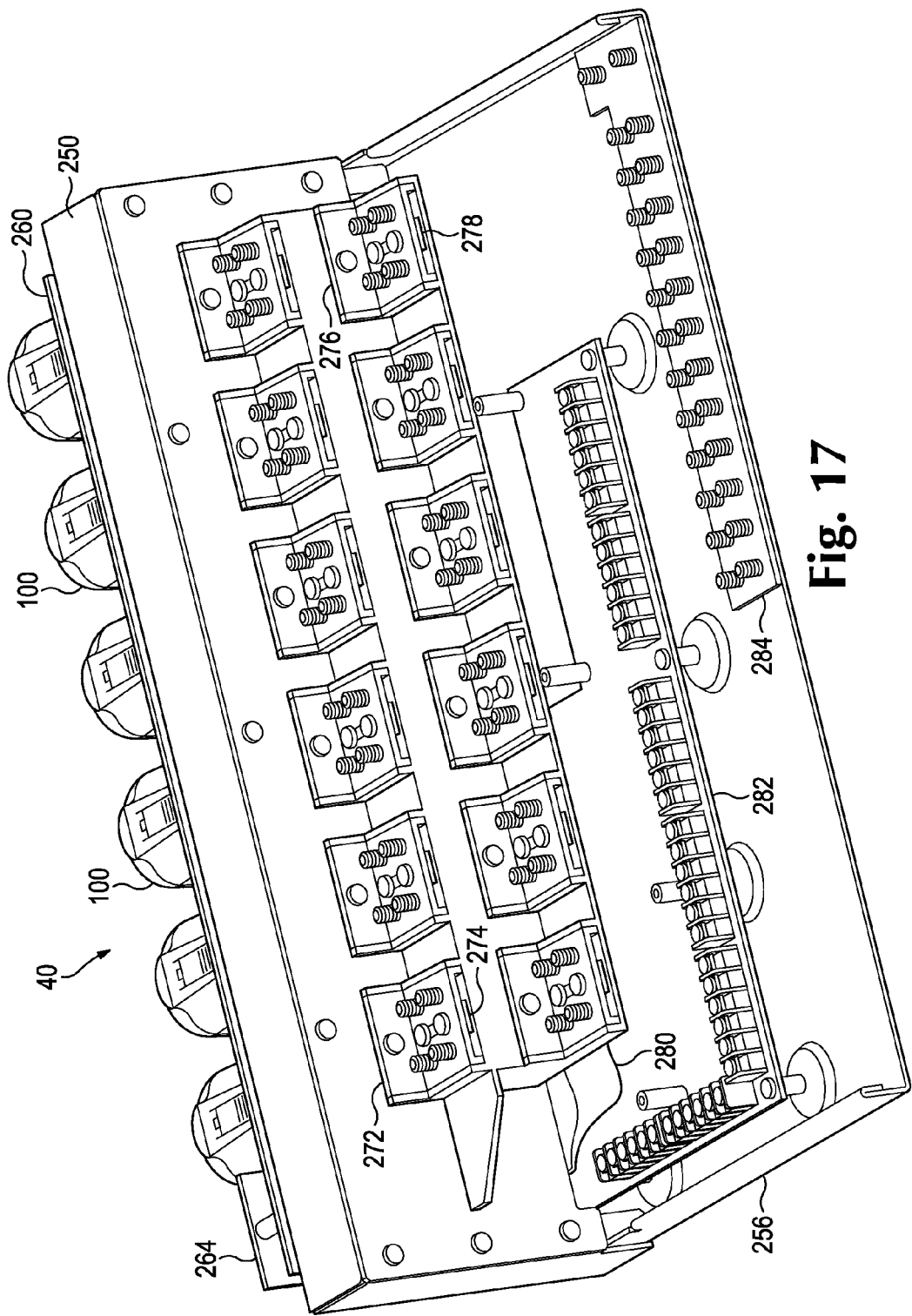
FIG. 17 shows a rear perspective view for the rack suppression unit.

FIG. 17 depicts an example rear view of rack suppression unit 40. A row of −48 DC terminal blocks 272 are connected on a bottom side to a row of −48 VDC bus bars 274. The −48 VDC bus bars 274 are each connected to −48 VDC clips that extend out from OVP board 260 (see FIG. 18). A row of return terminal blocks 276 are connected on bottom sides to a row of return bus bars 278. Return bus bars 278 are also connected to clips that extend out from circuit board 260. Ribbon cables 280 connect terminal blocks 272 and 276 to monitor board 282. A terminal strip 284 on bottom plate 256 connects to ground lines in the power cables and connects to ground clips that extend out from OVP board 260.

Figure 18:
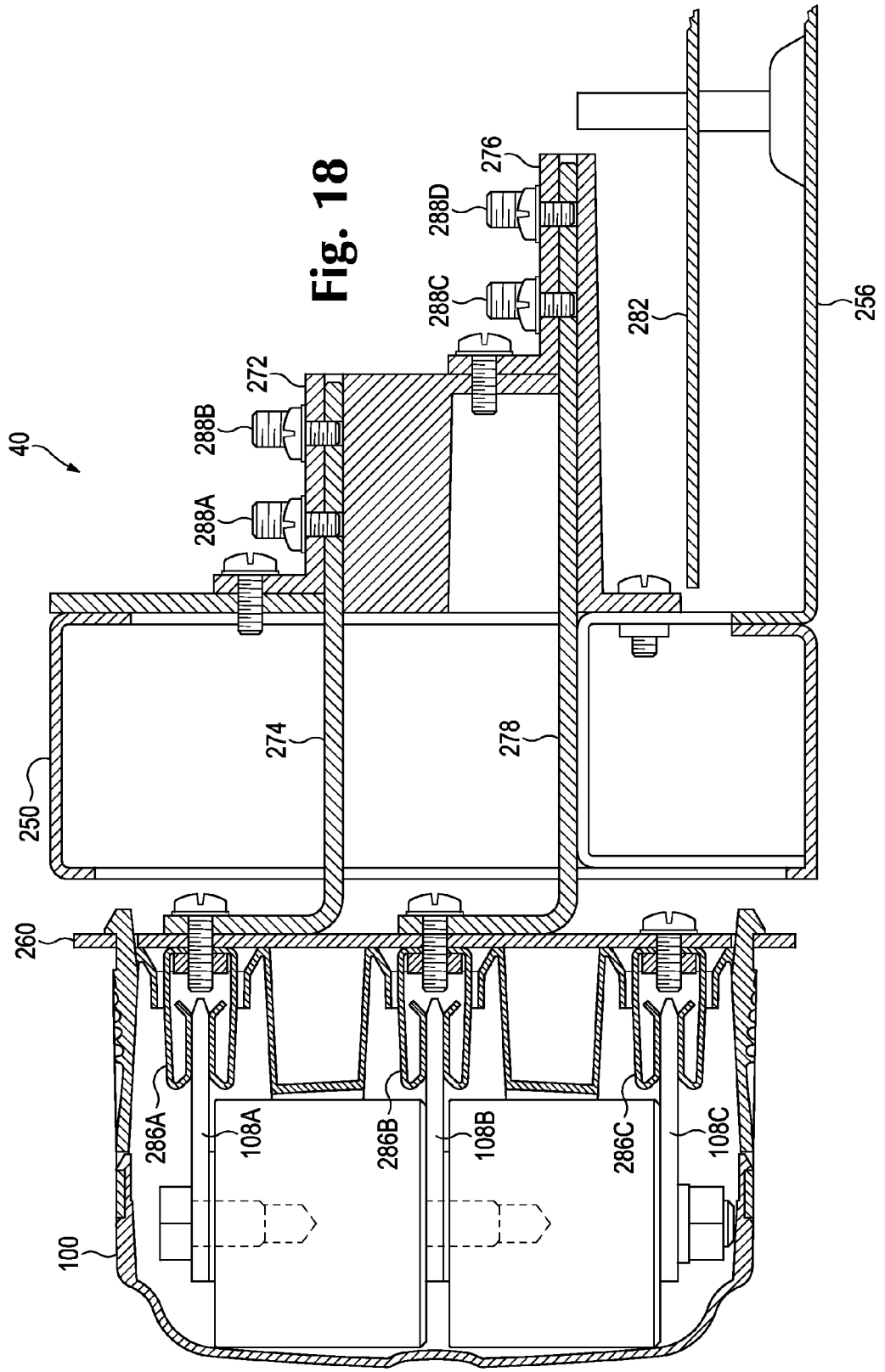
FIG. 18 shows a partial side section view for the rack suppression unit.

FIG. 18 is a partial cross-section view of rack suppression unit 40. OVP board 260 contains a row of clips 286A that each slidingly receives a −48 VDC bus bar 108A that extends out from one of suppression modules 100. OVP board 260 also contains a row of clips 286B that each slidingly receives a return bus bar 108B that extends out from one of suppression modules 100. OVP board 260 also contains a row of clips 286C that each slidingly receives a ground bus bar 108C that extends out from one of suppression modules 100.

Each −48 VDC clip 286A on OVP board 260 connects to one of −48 VDC bus bars 274. Each return clip 286B on OVP board 260 connects to one of return bus bars 278. Each ground clip 286C connects to a ground strip on OVP board 260 that connects to grounded frame 250 and grounded bottom plate 256. Each −48 VDC bus bar 274 has an L-shaped perpendicular front end that attaches to an elongated back side of OVP board 260 and a back end that attaches to one of −48 VDC terminal blocks 272. Each return bus bar 278 has an L-shaped front end that attaches to a back side of OVP board 260 and a back end that attaches to one of return terminal blocks 276.

Each −48 VDC terminal block 272 includes a first bolt 288A that connects to a −48 VDC power line from DC power bus 42 in FIG. 1 or 2, and a second bolt 288B that connects to a −48 VDC power cable that terminates either at base suppression unit 50 or at one of remote suppression units 20 in FIG. 1 or 2. Each return terminal block 276 includes a first bolt 288C that connects to a return power line from DC power bus 42 in FIG. 1 or 2, and a second bolt 288D that connects to a return power cable that terminates either at base suppression unit 50 or at one of remote suppression units 20 in FIG. 1 or 2.

Figure 19:
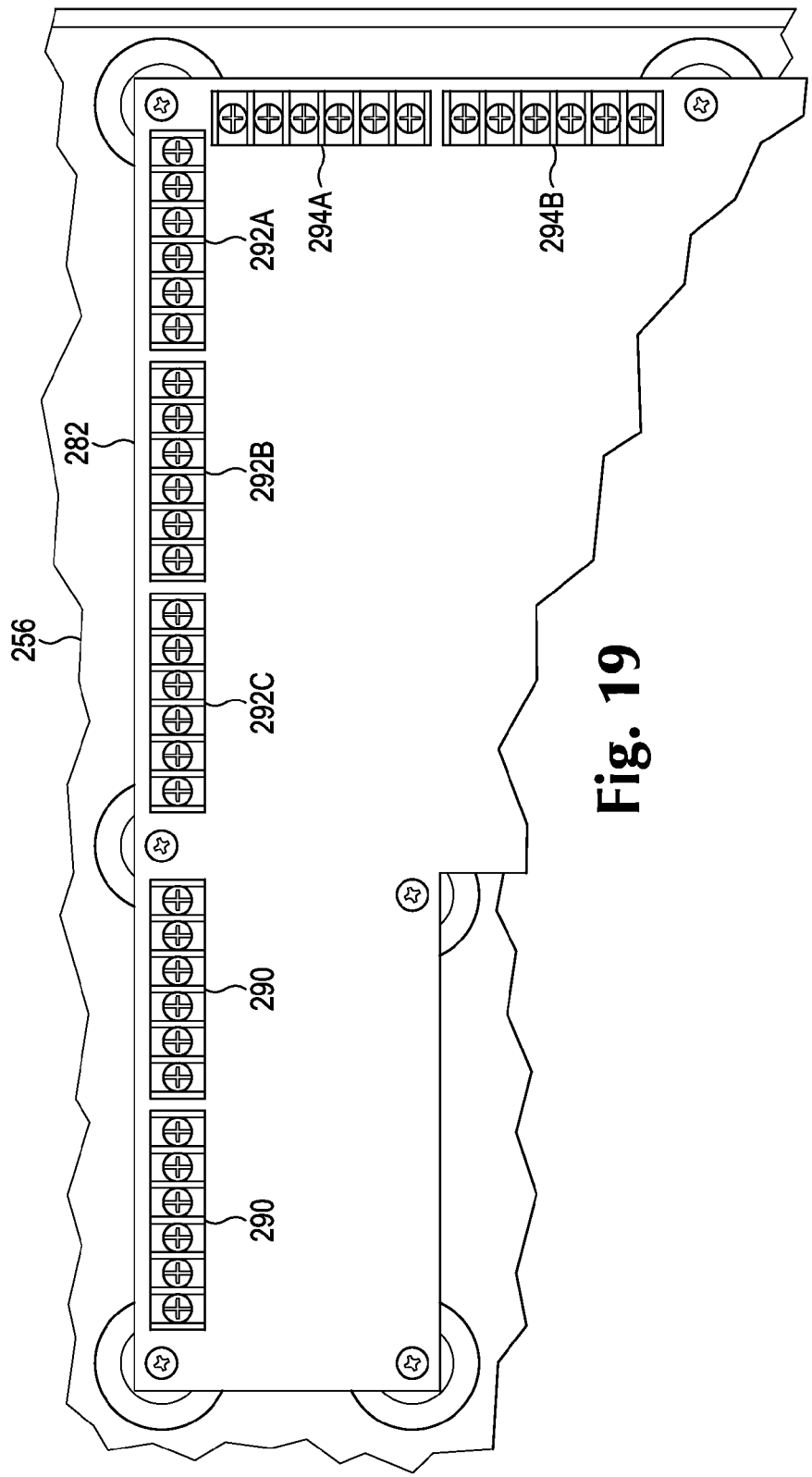
FIG. 19 shows a monitor board contained within the rack suppression unit.

FIG. 19 depicts a portion of monitor board 282 in rack suppression unit 40. A voltage sense terminal strip 290 receives the voltage sense lines from either the remote suppression units 20 or base suppression unit 50. Alarm terminals 292A, 292B, and 292C attach to intrusion, water, and OVP failure alarms lines from either the remote suppression units 20 or base suppression unit 50. Output terminals 294A and 294B generate intrusion, water, and/or OVP failure alarms signals in response to any of alarm signals on terminals 292 received from remote suppression units 20 or base suppression unit 50. Output terminals 294A and 294B also may activate an OVP failure alarm signal in response to a failure of one of suppression modules 100 in rack suppression unit 40.

Figure 20:
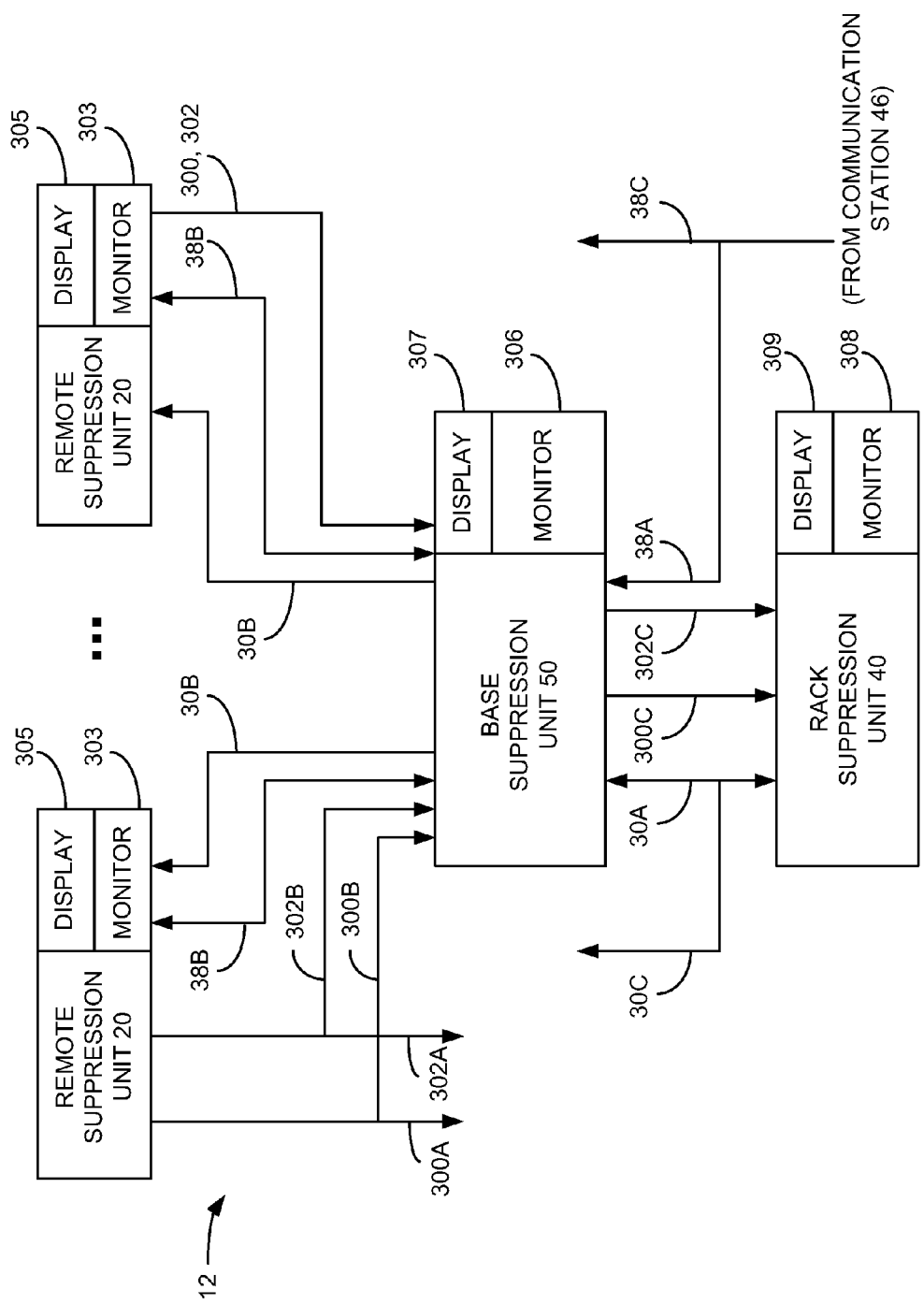
FIG. 20 shows a block diagram of the suppression system.

FIG. 20 depicts an example connection diagram for suppression system 12. As explained above, there are numerous ways that rack suppression unit 40, base suppression unit 50, and remote suppression units 20 may be connected together. In one example where base suppression unit 50 is not used, remote suppression units 20 receive DC power cables 30C from rack suppression unit 40 and receive fiber optic cables 38C from communication station 46 in FIG. 1.

In another configuration, rack suppression unit 40, base suppression unit 50 and remote suppression units 20 are all used in suppression system 12. In this configuration, base suppression unit 50 may operate as a terminal box or may contain suppression modules 100. In these configurations base suppression unit 50 receives DC power cables 30A from rack suppression unit 40 and receives fiber optic cables 38A from the communication station 46 in FIG. 2. Base suppression unit 50 then connects corresponding DC power cables 30B and fiber optic cables 38B to remote suppression units 20.

In yet another configuration, rack suppression unit 40 is not used, and base suppression unit 50 contains suppression modules that provide local suppression protection for circuitry within building 24 in FIGS. 1 and 2. In this configuration, base suppression unit 50 receives DC power cables 30A from the DC power plant and receives fiber optic cables 38A from communication station 46 in building 24. Base suppression unit 50 then connects corresponding DC power cables 30B and fiber optic cables 38B to remote suppression units 20.

Each remote suppression unit 20 includes monitor circuitry 303 and display circuitry 305. For example, monitor circuitry 303 may include the circuitry on monitor boards 72 and 74 and display circuitry 305 may include LEDs 152 and display 305 shown in FIGS. 6-8. Base suppression unit 50 includes monitor circuitry 306 and display circuitry 307. For example, monitor circuitry 306 may include the circuitry on monitor board 206 and display circuitry 307 may include LEDs 210 shown in FIG. 13. Rack suppression unit 40 includes monitor circuitry 308 and display circuitry 309. For example, monitor circuitry 308 may include the circuitry on monitor board 282 and display circuitry 309 may include LEDs 266 and display 270 shown in FIGS. 16 and 19.

A few example configurations are described below. However, it should be understood that other configurations may also be used. For explanation purposes, pairs of −48 VDC power lines, return power lines, and ground lines are referred to generally below as DC power cables.

Remote Suppression Units

If base suppression unit 50 is not used, remote suppression units 20 may receive DC power cables 30C and fiber optic cables 38C directly from rack suppression unit 40. If base suppression unit 50 is used, remote suppression units 20 may receive DC power cables 30B and fiber optic cables 38B from base suppression unit 50.

If base suppression unit 50 is not used, power sense lines 300A are connected directly between remote suppression units 20 and rack suppression unit 40. For example, low current −48 VDC and return sense lines 300A from each suppression module in remote suppression units 20 are connected to monitor circuitry 308 in rack suppression unit 40. Alarm lines 302A are connected between each remote suppression unit 20 and monitor circuitry 308. For example, an intrusion alarm line, an OVP alarm line, a water detection line, and a common line are connected between monitor circuitry 303 in each remote suppression unit 20 and monitor circuitry 308 in rack suppression unit 40.

If base suppression unit 50 is used, power sense lines 300B may be connected though terminals in base suppression unit 50 to rack suppression unit 40. When base suppression unit 50 is used, alarm lines 302B may be connected to monitor circuitry 306 in base suppression unit 50.

Monitor circuitry 303 monitors the remote voltage levels at the remote ends of DC power lines 30B or 30C and displays the monitored voltages in remote suppression unit 20. For example, monitor circuitry 303 uses display circuitry 305 to show the voltage levels supplied to each suppression module within remote suppression unit 20. This allows an installer to remotely determine if the correct voltage is being supplied to the radios proximate to remote suppression units 20. An insufficient voltage also may indicate an incorrect connection, a excessive voltage drop on the power cables, problems with the radios, or a suppression module failure, or the like, or any combination thereof.

Monitor circuitry 303 also detects intrusion and water alarm conditions in remote suppression unit 20 and identifies the conditions on display circuitry 305. For example, display circuitry 305 includes LEDs that are activated by monitor circuitry 303 in response to alarm signals generated by intrusion and water sensors. Monitor circuitry 303 also detects OVP failures in one or more of the suppression modules within remote suppression unit 20 and identify the failures via LEDs in display circuitry 305. Monitor circuitry 303 sends alarms signals identifying the intrusion, water, or OVP alarm conditions either to rack suppression unit 40 over alarm lines 302A or to base suppression unit 50 over alarm lines 302B.

Base Unit

Base suppression unit 50 may be connected between remote suppression units 20 and rack suppression unit 40. In this example, base suppression unit 50 may operate as a terminal box for distributing cable connections from rack suppression unit 40 to remote suppression units 20. Base suppression unit 50 also may contain suppression modules and use jumper cables to connect to radios. In another example, suppression system 12 may not include rack suppression unit 40. Base suppression unit 50 may contain suppression modules and operate as the local suppression unit for protecting circuitry within building 24 in FIGS. 1 and 2.

Base suppression unit 50 may receive DC power cables 30A from rack suppression unit 40 or directly from DC power plant 44 in FIGS. 1 and 2. Base suppression unit 50 includes terminals that connect DC power cables 30A with corresponding DC power cables 30B that connect to terminals in remote suppression units 20. Base suppression unit 50 includes fiber optic connectors that connect fiber optic cables 38A received from communication station 46 to corresponding fiber optic cables 38B that connect to remote suppression units 20.

Terminal strips in base suppression unit 50 may connect voltage sense lines 300B with voltage sense lines 300C that connect to monitor circuitry 308 in rack suppression unit 40. Alarm lines 302B may connect monitor circuitry 303 in remote suppression units 20 with monitor circuitry 306 in base suppression unit 50 and alarm lines 302C may connect monitor circuitry 306 with monitor circuitry 308 in rack suppression unit 40.

Monitor circuitry 306 may monitor remote alarm conditions in remote suppression units 20. For example, monitor circuitry 306 may activate an intrusion, water and/or OVP alarm LED in display circuitry 307 based on alarm signals received on alarm lines 302B. Monitor circuitry 306 also may activate LEDs in display circuitry 307 identifying which remote suppression units 20 or sectors detected the alarm conditions.

Monitor circuitry 306 also may detect and identify local intrusion, water, and/or OVP failure conditions within base suppression unit 50. For example, monitor circuitry 306 may activate the LEDs in display 307 that identify activation of the local instruction sensor, local water sensor, or one of the local OVP failure circuits within base suppression unit 50.

Rack Suppression Unit

As explained above, DC power cables 30C may connect directly between rack suppression unit 40 and remote suppression units 20. Alternatively, DC power cables 30A may connect rack suppression unit 40 to base suppression unit 50 and corresponding DC power cables 30B may connect base suppression unit 50 to remote suppression units 20.

Monitor circuitry 308 monitors local −48 VDC voltage levels connected to the suppression modules located within rack suppression unit 40 and displays the local voltages on display circuitry 309. Monitor circuitry 308 also displays the remote voltages received on voltage sense lines 300A or 300C on display circuitry 309. For example, selecting a push button connected to monitor circuitry 308 may display an upper voltage on display circuitry 309 identifying the remote −48 VDC voltage at a suppression device within one of remote suppression units 20.

Pushing the button a second time may cause display 309 to display the local −48 VDC voltage at rack suppression unit 40 for the same −48 VDC power line circuit connected to the remote suppression unit 20. Monitor circuitry 308 sequences through the upper (remote) and lower (local) −48 VDC voltages for each of the power line circuits in suppression system 12 in response to repeatedly pressing the button.

Monitor circuitry 308 also displays the alarm signals from remote suppression units 20 and/or base suppression unit 50. For example, monitor circuitry 308 activates LEDs in display circuitry 309 that identify the type of intrusion, water or OVP failure signal and the remote suppression unit 20 sector where the alarm signal was originally generated. Thus, voltage levels and alarm signals from any of suppression units 20, 50, and 40 are identified on display circuitry 309.

Figure 21:
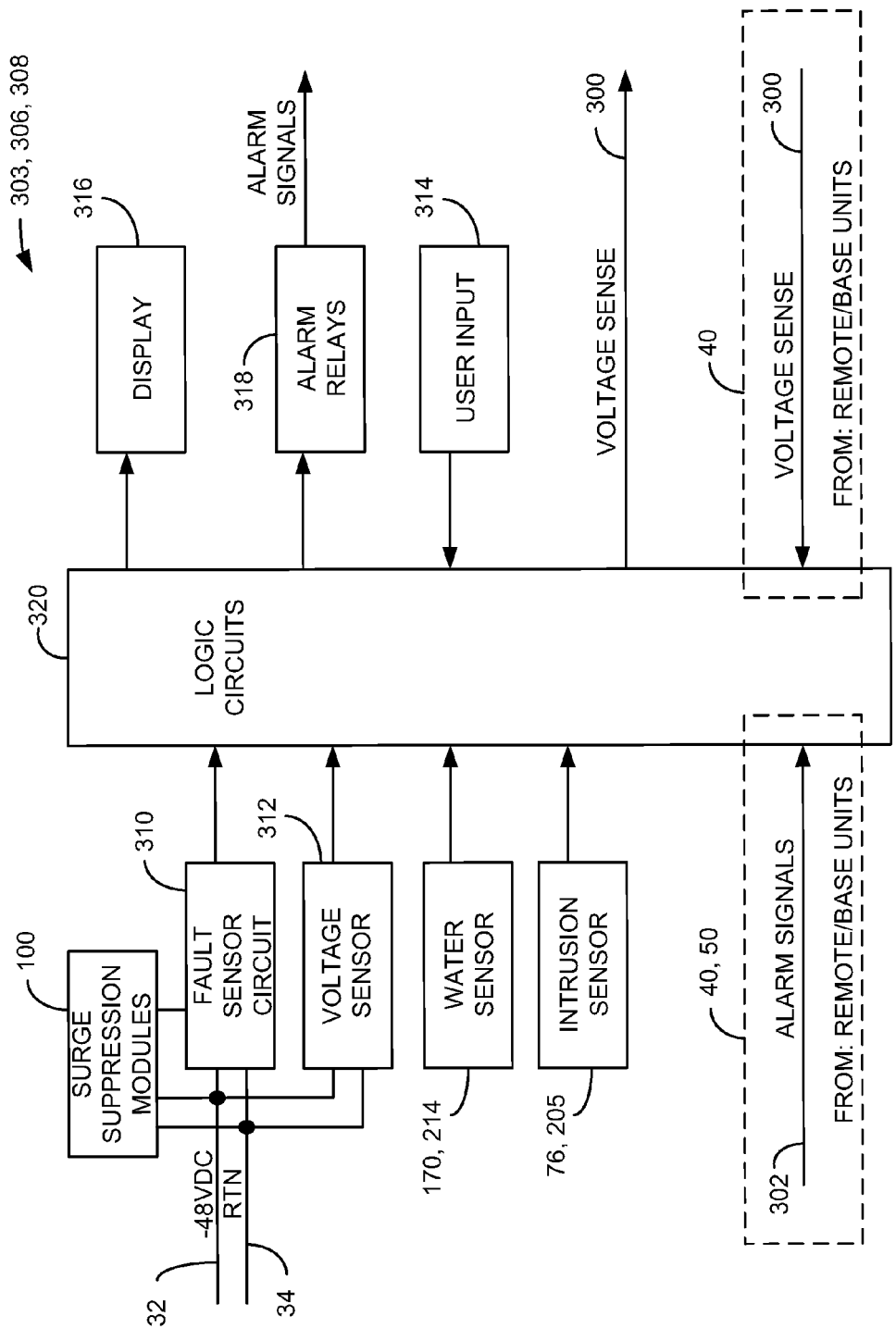
FIG. 21 shows a circuit diagram for monitoring circuitry used in the suppression system.

FIG. 21 is a block diagram for monitor circuitry 303, 306, or 308 in FIG. 20. Logic circuitry 320 may comprise any combination of printed circuit boards, analog circuitry, digital circuits, programmable logic devices, central processing units (CPUs), or the like, or any other components for detecting voltage and alarm conditions. A fault sensor circuit 310 generates an alarm signal in response to a failure of any one of suppression units 110 (FIG. 9) within any suppression modules 100. One example fault sensor circuit 310 is described in patent application Ser. No. 13/301,685 filed Nov. 21, 2011; entitled: MODULAR AND WEATHER RESISTANT OVERVOLTAGE PROTECTION SYSTEM FOR WIRELESS COMMUNICATION SYSTEMS which has been incorporated by reference.

A voltage sensor 312 measures the local or remote voltage across each −48 VDC power cable 32 and return power cable 34 in the suppression unit. Water sensor 170 or 214 generates an alarm signal in response to detecting water in either the remote suppression unit or the base suppression unit. Intrusion sensor 76 or 205 generates an alarm signal in response to detecting removal of the lid in either the remote suppression unit or the base suppression unit. User input 314 causes display 316 to display voltage levels measured by voltage sensor 312 for different local or remote ends of DC power cables 32 and 34.

Logic circuitry 320 generates voltage sense signals 300 that identify the local or remote −48 VDC voltage levels. Logic circuitry 320 in rack unit 40 may receive voltage sense signals 300 from remote suppression units 20 and/or from base suppression unit 50. Base unit 50 may receive alarm signals on alarm lines 302 from remote suppression units 20. Rack unit 40 may receive alarm signals on alarm lines 302 from remote suppression units 20 or from base suppression unit 50.

Alarm relays 318 in the base suppression unit 50 and rack suppression unit 40 may activate based on the alarm signals generated by fault sensor circuit 310, water sensors 170 or 214, or intrusion sensors 76 or 205. Alarm relays 318 also may activate based on signals received on alarm lines 302 received from remote suppression units 20 and/or base suppression unit 50.

Several preferred examples have been described above with reference to the accompanying drawings and pictures. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A suppression system, comprising:
 a remote suppression unit containing one or more suppression devices, wherein the remote suppression unit is configured to connect remote ends of DC power cables from a DC power plant to the suppression devices, and connect jumper power cables between the suppression devices and radios proximate to the remote suppression unit; and
 remote voltage monitoring circuitry contained within the remote suppression unit configured to measure remote voltages on the remote ends of the DC power cables.

2. The suppression system of claim 1, wherein the remote voltage monitoring circuitry includes a display located within the remote suppression unit configured to display the remote voltages.

3. The suppression system of claim 1, further comprising a voltage sense circuit configured to output the remote voltages on voltage sense lines, wherein the voltage sense lines are configured to connect to local monitoring circuitry at local ends of the DC power cables.

4. The suppression system of claim 3, wherein the local monitoring circuitry is configured to:
 measure local voltages on the local ends of the DC power cables;
 measure the remote voltages received over the voltage sense lines; and
 display the local voltages and the remote voltages.

5. The suppression system of claim 3, wherein the local monitoring circuitry is located within a local suppression unit that contains additional suppression devices connected to the local ends of the DC power cables.

6. The suppression system of claim 1, further comprising remote alarm circuitry located within the remote suppression unit configured to detect and identify different alarm conditions.

7. The suppression system of claim 6, further comprising an intrusion sensor located within the remote suppression unit, wherein the remote alarm circuitry is configured to identify an intrusion into the remote suppression unit based on the intrusion sensor.

8. The suppression system of claim 6, further comprising a water sensor located within the remote suppression unit, wherein the remote alarm circuitry is configured to identify water infiltration within the remote suppression unit based on the water sensor.

9. The suppression system of claim 6, wherein the remote alarm circuitry is configured to connect to alarm lines and the alarm lines are configured to connect to local alarm circuitry at local ends of the DC power cables.

10. The suppression system of claim 9, wherein:
 the remote alarm circuitry is configured to identify overvoltage protection failures in the suppression devices within the remote suppression unit; and
 the local alarm circuitry is configured to identify the overvoltage protection failures in the suppression devices within the remote suppression unit and identify overvoltage protection failures for suppression devices connected to the local ends of the DC power cables.

11. An apparatus, comprising:
 a base configured to receive primary power cables and primary fiber optic cables;
 a shell attached on top of the base, wherein the shell includes a back wall and lower arms extending forward from sides of the back wall;
 a circuit board attached to the back wall;
 connectors coupled to the circuit board configured to connect to the primary power cables; and
 a front panel rotatably attached at a bottom end in-between the lower arms of the shell, wherein the front panel includes a fiber optic tray for retaining the fiber optic cables.

12. The apparatus claim 11, further comprising upper arms extending forward from the sides of the back wall, wherein an upper end of the panel is configured to rotate upwards and attach to the upper arms.

13. The apparatus of claim 11, wherein the connectors include a first set of terminals configured to connect to a first power line in the primary power cables and a second power line in secondary power cables.

14. The apparatus of claim 13, wherein the primary power cables are configured to connect to a DC power plant and the secondary power cables are configured to connect to remote suppression units.

15. The apparatus of claim 13, wherein:
 the connectors are further configured to connect the primary power cables and the secondary power cables to surge suppression devices located on the circuit board; and
 the secondary power cables are configured to connect to radios.

16. The apparatus of claim 13, further comprising alarm monitoring circuitry configured to detect and display remote alarm conditions at a local end of the secondary power cables and to detect and display local alarm conditions at a remote end of the primary power cables.

17. The apparatus of claim 11, further comprising voltage monitoring circuitry configured to measure and display a remote voltage at a remote end of the primary power cables.

18. The apparatus of claim 11, further comprising a lid configured to attach over the base and shell and form an internal compartment, and further comprising alarm monitoring circuitry configured to detect an intrusion and/or water infiltration within the internal compartment.

19. An apparatus, comprising:
a frame;
an over-voltage protection (OVP) board attached to a front side of the frame;
clips attached on a front side of the OVP board configured to retain surge suppression modules;
bus bars extending through the frame and having front ends extending out from the front side of the frame and attaching to the clips from a back side of the OVP board and back ends extending out from a back side of the frame; and
terminal blocks connected to the back ends of the bus bars configured to connect to power cables.

20. The apparatus of claim 19, wherein the frame is configured to insert into a rack.

21. The apparatus of claim 19, wherein the bus bars comprise a first row configured to connect to voltage direct current (VDC) lines in the power cables and a second row configured to connect to return lines in the power cables.

22. The apparatus of claim 19, wherein the front ends of the bus bars are perpendicular to the back ends of the bus bars and middle sections of the bus bars.

23. The apparatus of claim 19, further comprising voltage monitoring circuitry configured to measure and display local voltages at a local end of the power cables and measure and display remote voltages at remote ends of the power cables.

24. The apparatus of claim 19, further comprising alarm monitoring circuitry configured to detect and display alarm conditions at remote ends of the power cables, wherein the alarm conditions comprise one or more of an intrusion, water, and/or an over-voltage protection failure within a remote suppression unit.

* * * * *